US012675385B2

(12) United States Patent
Baid

(10) Patent No.: US 12,675,385 B2
(45) Date of Patent: Jul. 7, 2026

(54) AUTOMATING CODE ANALYSIS, DEPENDENCY MAPPING, AND ADAPTIVE TASK EXECUTION WITH AI

(71) Applicant: Nirmal Singh Baid, Miami, FL (US)

(72) Inventor: Nirmal Singh Baid, Miami, FL (US)

(*) Notice: Subject to any disclaimer, the term of this patent is extended or adjusted under 35 U.S.C. 154(b) by 0 days.

(21) Appl. No.: 19/349,934

(22) Filed: Oct. 3, 2025

(65) Prior Publication Data

US 2026/0099421 A1     Apr. 9, 2026

Related U.S. Application Data

(60) Provisional application No. 63/704,626, filed on Oct. 8, 2024.

(51) Int. Cl.
*G06F 9/44* (2018.01)
*G06F 11/3604* (2025.01)

(52) U.S. Cl.
CPC ................................. *G06F 11/3604* (2013.01)

(58) Field of Classification Search
CPC .................................................... G06F 11/3604
See application file for complete search history.

(56) References Cited

U.S. PATENT DOCUMENTS

| | | | |
|---|---|---|---|
| 7,069,560 B1 | 6/2006 | Cheyer et al. |
| 7,788,640 B2 | 8/2010 | Grimaldi |
| 8,607,203 B1 | 12/2013 | Mehra |
| 9,250,884 B2 | 2/2016 | Ravi |
| 10,339,537 B2 | 7/2019 | Kholkar et al. |
| 10,877,869 B1 | 12/2020 | Nair et al. |

| | | | |
|---|---|---|---|
| 11,669,556 B1 | 6/2023 | Hasan et al. |
| 11,733,999 B2 | 8/2023 | Battaglia et al. |
| 11,762,657 B2 | 9/2023 | Bennani et al. |
| 11,855,844 B2 | 12/2023 | Verma et al. |
| 12,430,150 B1 | 9/2025 | Bavishi et al. |

(Continued)

FOREIGN PATENT DOCUMENTS

EP        4180955 A1     5/2023

OTHER PUBLICATIONS

Dayu Yang, et al., DocAgent: A Multi-Agent System for Automated Code Documentation Generation, arXiv:2504.08725v1 [cs,SE] Apr. 11, 2025, pp. 1-13.
WIPO, Patent Landscape Report—Generative Artificial Intelligence (GenAI)—Appendices, found at https://www.wipo.int/web-publications/, as of Feb. 10, 2026.

(Continued)

*Primary Examiner* — Hang Pan

(57) ABSTRACT

Methods, systems, and devices for automating code analysis, dependency mapping, and adaptive task execution with artificial intelligence are described. In some implementations, a server platform may receive input data including a codebase and associated documentation. The server platform may parse the input data to extract task parameters, generate meta tags describing functions and dependencies, and construct a workflow representation of tasks, the workflow representation including operating-system-level input events and associated state transitions. The server platform may execute the workflow representation by generating the operating-system-level input events and verifying state transitions through a perception layer that captures pre-execution and post-execution states. Each executed input event and corresponding state transition may be logged in a provenance module with cryptographic metadata for secure auditability.

23 Claims, 15 Drawing Sheets

(56) References Cited

U.S. PATENT DOCUMENTS

| | | | |
|---|---|---|---|
| 12,437,238 B1 | 10/2025 | Zarkesh et al. | |
| 2010/0023926 A1* | 1/2010 | Sugawara | G06F 8/75 |
| | | | 717/120 |
| 2011/0231823 A1* | 9/2011 | Fryc | G06F 11/3688 |
| | | | 717/125 |
| 2018/0052898 A1 | 2/2018 | Allan et al. | |
| 2021/0081302 A1* | 3/2021 | Reicher | G06F 11/3684 |
| 2021/0089429 A1* | 3/2021 | Mola | G06F 11/3096 |
| 2021/0191845 A1* | 6/2021 | Bach | G06F 11/3688 |
| 2021/0334095 A1* | 10/2021 | Nakamura | G06N 3/09 |
| 2023/0108422 A1 | 4/2023 | Brauer et al. | |
| 2023/0223008 A1 | 7/2023 | Kumar et al. | |
| 2023/0289621 A1 | 9/2023 | Kadakia et al. | |
| 2024/0264828 A1 | 8/2024 | Moran et al. | |
| 2024/0281600 A1 | 8/2024 | Brown et al. | |
| 2025/0202973 A1 | 6/2025 | Chao et al. | |
| 2025/0259043 A1 | 8/2025 | Crabtree et al. | |
| 2025/0259085 A1 | 8/2025 | Crabtree et al. | |

OTHER PUBLICATIONS

Adept Team, ACT-1: Transformer for Actions, found at https://www.adept.ai/blog/act-1/, as of Feb. 10, 2026.

Mintplex Labs, Anything LLM webpage, found at https://docs.anythingllm.com/introduction, as of Feb. 10, 2026.

Anthropic, Introducing computer use . . . , dated Oct. 22, 2024, found at https://www.anthropic.com/news/3-5-models-and-computer-use, as of Feb. 11, 2026.

Anthropic, Developing a computer use model, dated Oct. 22, 2024, found at https://www.anthropic.com/news/developing-computer-use, as of Feb. 11, 2026.

Openai, Introducing Operator, dated Jan. 23, 2025, found at https://openai.com/index/introducing-operator/, as of Feb. 11, 2026.

Openai, Computer-Using Agent, dated Jan. 23, 2025, found at https://openai.com/index/computer-using-agent/, as of Feb. 11, 2026.

Openai, Operator System Card, dated Jan. 23, 2025, found at https://cdn.openai.com/operator_system_card.pdf, as of Feb. 11, 2026.

Openai, Computer Use, found at https://developers.openai.com/api/docs/guides/tools-computer-use, as of Feb. 11, 2026.

* cited by examiner

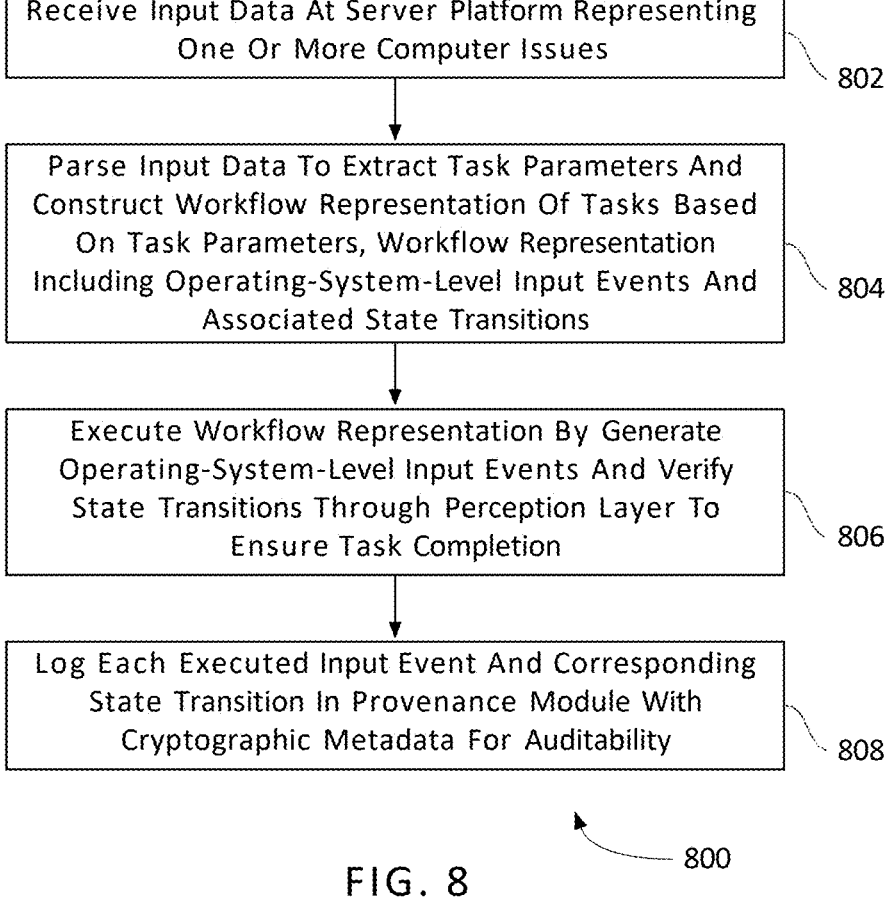

Receive Input Data At Server Platform Representing One Or More Computer Issues

⟍ 802

Parse Input Data To Extract Task Parameters And Construct Workflow Representation Of Tasks Based On Task Parameters, Workflow Representation Including Operating-System-Level Input Events And Associated State Transitions

⟍ 804

Execute Workflow Representation By Generate Operating-System-Level Input Events And Verify State Transitions Through Perception Layer To Ensure Task Completion

⟍ 806

Log Each Executed Input Event And Corresponding State Transition In Provenance Module With Cryptographic Metadata For Auditability

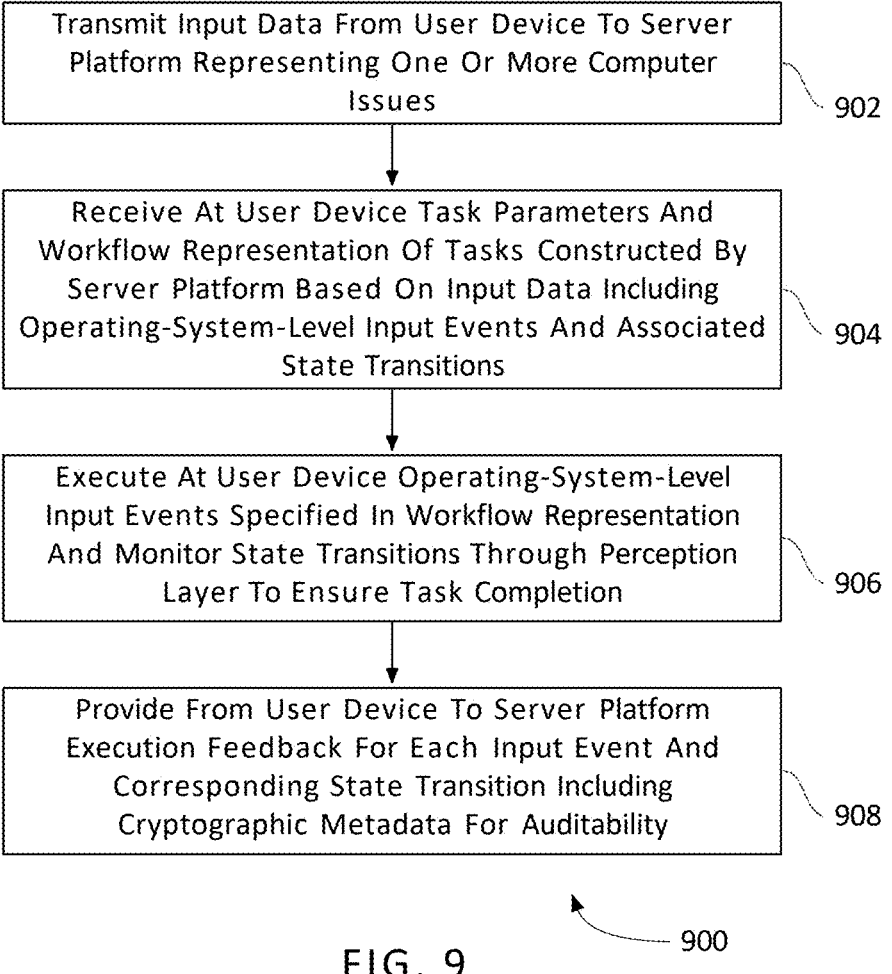

Transmit Input Data From User Device To Server Platform Representing One Or More Computer Issues — 902

Receive At User Device Task Parameters And Workflow Representation Of Tasks Constructed By Server Platform Based On Input Data Including Operating-System-Level Input Events And Associated State Transitions — 904

Execute At User Device Operating-System-Level Input Events Specified In Workflow Representation And Monitor State Transitions Through Perception Layer To Ensure Task Completion — 906

Provide From User Device To Server Platform Execution Feedback For Each Input Event And Corresponding State Transition Including Cryptographic Metadata For Auditability — 908

FIG. 9  900

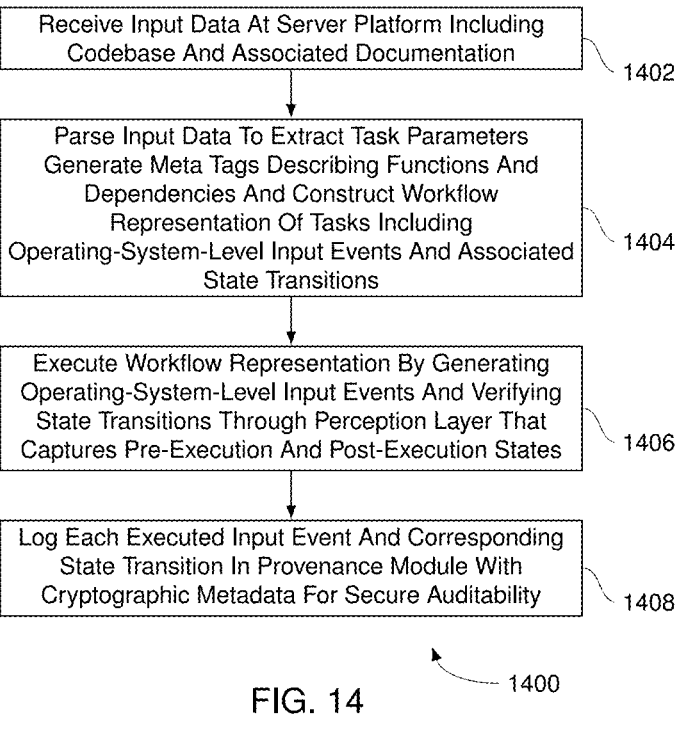

Receive Input Data At Server Platform Including Codebase And Associated Documentation

1402

Parse Input Data To Extract Task Parameters Generate Meta Tags Describing Functions And Dependencies And Construct Workflow Representation Of Tasks Including Operating-System-Level Input Events And Associated State Transitions

1404

Execute Workflow Representation By Generating Operating-System-Level Input Events And Verifying State Transitions Through Perception Layer That Captures Pre-Execution And Post-Execution States

1406

Log Each Executed Input Event And Corresponding State Transition In Provenance Module With Cryptographic Metadata For Secure Auditability

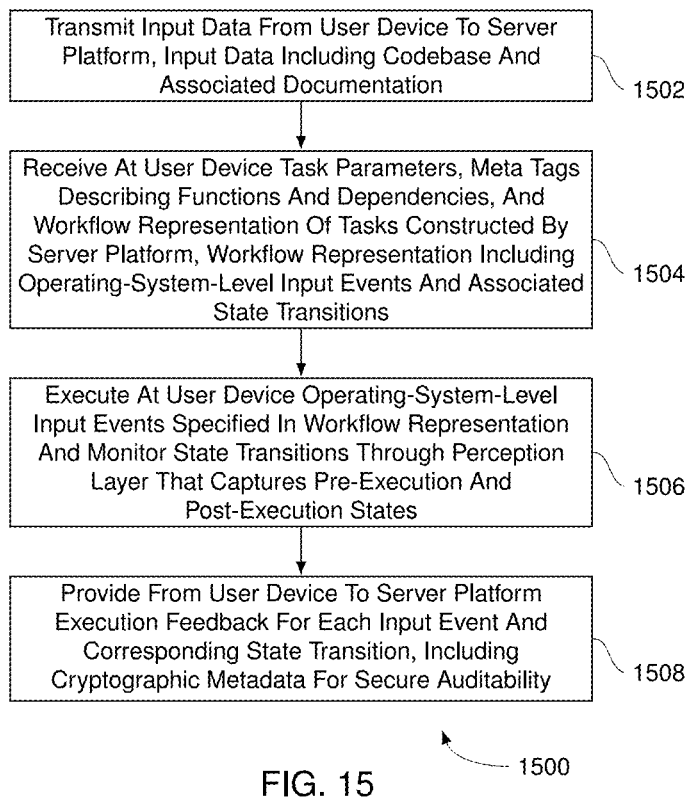

Transmit Input Data From User Device To Server
Platform, Input Data Including Codebase And
Associated Documentation                               1502

Receive At User Device Task Parameters, Meta Tags
Describing Functions And Dependencies, And
Workflow Representation Of Tasks Constructed By
Server Platform, Workflow Representation Including     1504
Operating-System-Level Input Events And Associated
State Transitions Execute At User Device Operating-System-Level
Input Events Specified In Workflow Representation
And Monitor State Transitions Through Perception
Layer That Captures Pre-Execution And                 1506
Post-Execution States Provide From User Device To Server Platform
Execution Feedback For Each Input Event And
Corresponding State Transition, Including
Cryptographic Metadata For Secure Auditability        1508

AUTOMATING CODE ANALYSIS, DEPENDENCY MAPPING, AND ADAPTIVE TASK EXECUTION WITH AI

CROSS REFERENCE TO RELATED APPLICATIONS

The present Application for Patent claims the benefit of U.S. Provisional Patent Application No. 63/704,626, entitled System and Method for Automated Code Analysis, Meta Tagging, Dependency Mapping, and Dynamic Help Desk Generation Using AI, LLMs, GANs, and Multi-Modal Interfaces, filed on Oct. 8, 2024, and which is hereby incorporated by reference in its entirety.

FIELD OF TECHNOLOGY

The present disclosure relates generally to database systems and data processing, and more specifically to automating code analysis, dependency mapping, and adaptive task execution with AI.

BACKGROUND

In the field of software development and automation, systems may involve tools and methods for analyzing codebases, generating documentation, and mapping dependencies. These systems may utilize techniques such as abstract syntax tree parsing, metadata generation, and graphical representations of software relationships. Workflow automation systems may execute tasks through operating-system-level events, including cursor movements, keystrokes, and touch gestures.

SUMMARY

The described techniques relate to improved methods, systems, devices, and apparatuses that support techniques for automating code analysis, dependency mapping, and adaptive task execution with AI. Some implementations may provide a system and method that leverage artificial intelligence, including large language models and generative adversarial networks, to automate code analysis, generate meta tags, and map dependencies. The system may construct dynamic workflows by parsing input data and executing operating-system-level events, such as cursor movements, keystrokes, and touch gestures. A perception layer may verify state transitions through techniques such as optical character recognition, accessibility tree parsing, and document object model analysis, ensuring reliable task execution. Each executed event and state transition may be logged in a cryptographic provenance module, creating a secure and auditable record of actions.

Some implementations may further integrate a multimodal help desk engine capable of interacting with users through text, voice, graphics, media, and URLs. This engine may dynamically adapt to user input and software changes, providing real-time assistance and task execution. The system may support both scenarios with and without access to source code, enabling training on codebases and documentation or autonomous exploration of graphical user interfaces. By combining advanced artificial intelligence models, adaptive state verification, and secure provenance logging, some implementations may address inefficiencies in software development, task automation, and user support, offering a scalable and reliable solution for modern computing environments.

A method for automating code analysis, dependency mapping, and adaptive task execution with AI is described. The method may include receiving input data at a server platform, the input data including a codebase and associated documentation. The method may include parsing the input data to extract task parameters, generate meta tags describing functions and dependencies, and construct a workflow representation of tasks, the workflow representation including operating-system-level input events and associated state transitions. The method may include executing the workflow representation by generating the operating-system-level input events and verifying state transitions through a perception layer that captures pre-execution and post-execution states. The method may include logging each executed input event and corresponding state transition in a provenance module with cryptographic metadata for secure auditability.

A system configured for automating code analysis, dependency mapping, and adaptive task execution with AI is described. The system may include a processor, memory coupled with the processor, and instructions stored in the memory and executable by the processor. The instructions may cause the system to receive input data at a server platform, where the input data may include a codebase and associated documentation. The instructions may cause the system to parse the input data to extract task parameters, generate meta tags describing functions and dependencies, and construct a workflow representation of tasks, the workflow representation including operating-system-level input events and associated state transitions. The instructions may cause the system to execute the workflow representation by generating the operating-system-level input events and verifying state transitions through a perception layer that captures pre-execution and post-execution states. The instructions may cause the system to log each executed input event and corresponding state transition in a provenance module with cryptographic metadata for secure auditability.

Another system for automating code analysis, dependency mapping, and adaptive task execution with AI is described. The system may include means for receiving input data at a server platform, the input data including a codebase and associated documentation. The system may include means for parsing the input data to extract task parameters, generate meta tags describing functions and dependencies, and construct a workflow representation of tasks, the workflow representation including operating-system-level input events and associated state transitions. The system may include means for executing the workflow representation by generating the operating-system-level input events and verifying state transitions through a perception layer that captures pre-execution and post-execution states. The system may include means for logging each executed input event and corresponding state transition in a provenance module with cryptographic metadata for secure auditability.

A non-transitory computer-readable medium storing code for automating code analysis, dependency mapping, and adaptive task execution with AI is described. The code may include instructions executable by a processor to receive input data at a server platform, the input data including a codebase and associated documentation. The code may include instructions executable by a processor to parse the input data to extract task parameters, generate meta tags describing functions and dependencies, and construct a workflow representation of tasks, the workflow representation including operating-system-level input events and associated state transitions. The code may include instructions executable by a processor to execute the workflow representation by generating the operating-system-level input events and verifying state transitions through a perception layer that captures pre-execution and post-execution states. The code may include instructions executable by a processor to log each executed input event and corresponding state transition in a provenance module with cryptographic metadata for secure auditability.

Some examples of the method, systems, and non-transitory computer-readable medium described herein may further include operations, features, means, or instructions for generating a dependency graph that visually represents relationships among functions, classes, modules, and external libraries. The dependency graph may be rendered through an interactive interface that supports filtering by relationship type and zooming into specific nodes.

Some examples of the method, systems, and non-transitory computer-readable medium described herein may further include operations, features, means, or instructions for analyzing historical user interactions with the workflow representation to predict subsequent tasks. The predicted tasks may be appended to the workflow representation for execution.

Some examples of the method, systems, and non-transitory computer-readable medium described herein may further include operations, features, means, or instructions for adapting the workflow representation to include alternative operating-system-level input events in response to detecting a failure in a state transition during execution.

Some examples of the method, systems, and non-transitory computer-readable medium described herein may further include operations, features, means, or instructions for generating multi-modal outputs, including text, voice, graphics, and media. The multi-modal outputs may provide user-facing explanations of the workflow representation and its execution results.

Some examples of the method, systems, and non-transitory computer-readable medium described herein may further include operations, features, means, or instructions for training a machine learning model on the meta tags and task parameters. The training may refine the parsing of subsequent input data and enhance the accuracy of the workflow representation.

In some examples of the method, systems, and non-transitory computer-readable medium described herein, the perception layer may capture accessibility tree snapshots and compare hierarchical structures to verify state transitions associated with the operating-system-level input events.

In some examples of the method, systems, and non-transitory computer-readable medium described herein, the provenance module may store cryptographic metadata including timestamps, unique identifiers, and hashes of pre-execution and post-execution states for auditability.

In some examples of the method, systems, and non-transitory computer-readable medium described herein, the workflow representation may include conditional logic for selecting alternative state transitions in response to detecting specific error messages during execution.

In some examples of the method, systems, and non-transitory computer-readable medium described herein, the workflow representation may incorporate predictive task suggestions derived from analyzing patterns in historical user interactions and system logs.

BRIEF DESCRIPTION OF THE DRAWINGS

FIG. 8 illustrates a labeled flowchart that supports techniques for automating code analysis, dependency mapping, and adaptive task execution with AI in accordance with various aspects of the present disclosure.

FIG. 9 illustrates a labeled flowchart that supports techniques for automating code analysis, dependency mapping, and adaptive task execution with AI in accordance with various aspects of the present disclosure.

FIG. 14 illustrates an example of a flowchart illustrating methods that support automating code analysis, dependency mapping, and adaptive task execution with AI in accordance with various aspects of the present disclosure.

FIG. 15 illustrates an example of a flowchart illustrating methods that support automating code analysis, dependency mapping, and adaptive task execution with AI in accordance with various aspects of the present disclosure.

DETAILED DESCRIPTION

Figure 1:
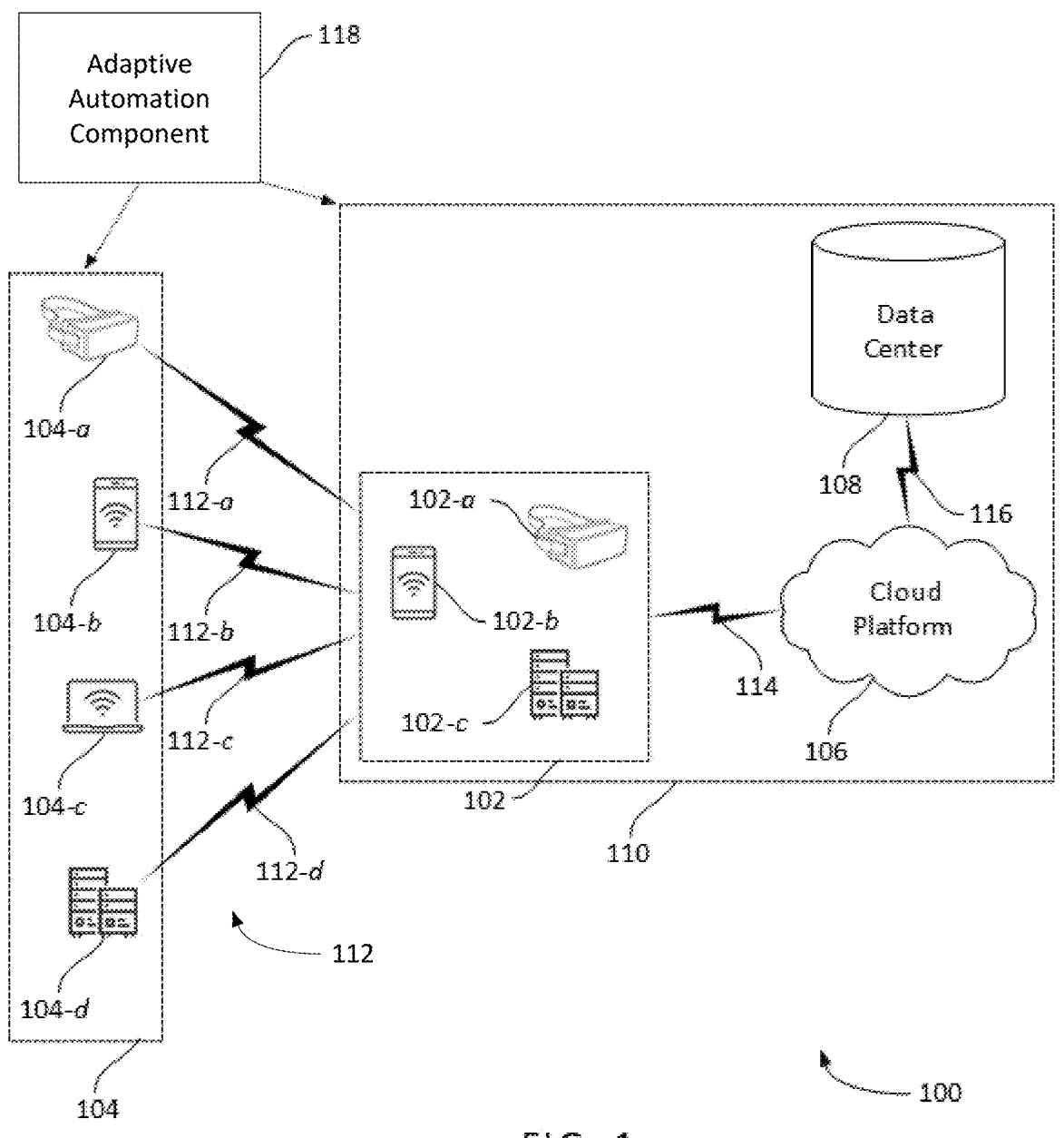
FIG. 1 illustrates an example of a system for data processing that supports automating code analysis, dependency mapping, and adaptive task execution with AI in accordance with aspects of the present disclosure.

Methods, systems, devices, and apparatuses that support techniques for automating code analysis, dependency mapping, and adaptive task execution with AI are disclosed. In some examples, modern software systems may be increasingly complex, requiring developers and users to navigate intricate interdependencies and workflows. Manual code analysis and documentation may be time-consuming and prone to errors, leading to incomplete or outdated information. Existing help desk systems may be static and lack the ability to dynamically adapt to user needs or software changes. Additionally, traditional task execution systems may often fail to verify state transitions, resulting in unreliable workflows. The lack of secure provenance logging may further limit accountability and compliance in automated systems. Current solutions may not integrate advanced artificial intelligence models, such as large language models and generative adversarial networks, to enhance code analysis, dependency mapping, or user interaction. These limitations may hinder efficiency, scalability, and reliability in software development and task automation.

In some implementations, a system may analyze software codebases to automate the process of understanding and documenting their structure and functionality. The system may ingest an entire codebase using automated tools that decompose the code into components such as functions, methods, classes, and modules. These components may then be analyzed to generate descriptive annotations, referred to as meta tags, which may include details about the purpose of each code element, its input parameters, output values, and relationships with other elements. Artificial intelligence models may be employed to interpret the code and produce accurate descriptions for these meta tags. To support multiple programming languages, the system may utilize specialized tools, such as language-specific parsers, tailored to the syntax and semantics of each language. The generated meta tags may be compiled into various documentation formats, including web pages, text files, or printable documents, to provide a human-readable summary of the codebase. Additionally, the system may map relationships between different parts of the software, such as functions, classes, modules, and external libraries, storing these relationships in specialized databases that represent connections as nodes and links. This structure may enable efficient querying and visualization, with graphical representations allowing users to explore connections interactively by zooming, filtering, and searching for specific components.

In some implementations, workflows may be constructed to represent tasks that the system performs, encompassing sequences of actions such as moving a cursor, pressing keys, clicking buttons, or interacting with touchscreens. Each action may correspond to a change in the state of the software, and the system may associate these state changes with the actions performed. These workflows may evolve dynamically as the system encounters errors or unexpected behaviors, incorporating conditional logic to select alternative actions when necessary. The system may autonomously explore user interfaces by interacting with them, capturing images of the interface, and recording changes in state to build representations of workflows. To enhance user interaction, a help desk engine may be included, which may communicate with users through text, voice, graphical elements, images, or links to external resources. This engine may execute tasks based on user input and provide feedback during the process, adapting its responses to the user's preferred language by automatically detecting and switching between supported languages as needed. Furthermore, the system may monitor the state of the software before and after performing actions to verify that intended changes have occurred. This monitoring may involve capturing and analyzing images of the software interface, examining structural differences, and adjusting actions if expected changes are not observed to ensure task completion.

In some implementations, the system may log every action performed and the corresponding state changes in a secure module designed to prevent tampering. Each log entry may include details such as the time the action was performed, identifiers for the software being interacted with, and cryptographic data to ensure the integrity of the records. These logs may be stored in decentralized databases to enhance transparency and allow for independent verification. The system may operate with or without access to the software's source code. When the source code is available, artificial intelligence models may be trained using the codebase and supplementary materials, such as user guides and frequently asked questions, to generate workflows and responses tailored to the software. When the source code is not available, the system may explore the software interface autonomously by simulating user actions, capturing images, and constructing workflows based on observed behaviors. Multiple artificial intelligence models and generative models may be used to analyze user inputs and generate outputs, with a module comparing their results to ensure accuracy before proceeding with the next step in the workflow. Visual aids, such as flowcharts, task flow maps, and mockups of user interfaces, may also be generated dynamically by generative models to help users understand workflows.

In some implementations, the system may analyze past user activity to identify patterns and predict tasks that users may perform in the future. Based on these predictions, the system may suggest tasks for automation or execution. The system may also allow multiple users to collaborate on the same workflow simultaneously, synchronizing contributions and resolving conflicts to ensure smooth progression. To enhance portability, the system may serialize the state of workflows, including details such as cursor positions and open windows, into secure formats that may be synchronized across devices. This serialization may enable users to resume tasks seamlessly on different platforms. Additionally, the system may detect errors in software code during task execution or development, providing suggestions for resolving these errors, including examples of corrected code and step-by-step guidance. Workflows may be adjusted dynamically based on errors encountered during execution, with the system analyzing the error state, determining potential solutions, and updating the workflow to prevent similar issues in the future. The system may also integrate information from various sources, such as code dependencies, workflows, and user inputs, into a unified representation that may be continuously updated as new information is discovered.

In some implementations, workflows may be executed autonomously, with the system verifying each step to ensure successful completion. Alternatively, the system may guide users through workflows step by step, verifying each action performed by the user. Safeguards may be included to prevent unintended actions during workflow execution, such as limiting the duration and frequency of actions, restricting certain operations, and allowing users to cancel actions if needed. The system may train agents to optimize workflows by simulating interactions with the software, practicing workflows repeatedly, and encountering different scenarios to improve task handling. Pre-configured user interface layouts may also be created to streamline interactions with the software. The system may select the most appropriate method for executing tasks based on factors such as security, speed, and user preferences, switching to alternative methods if one fails to ensure task continuity. When errors occur, the system may repair workflows by generating solutions, testing them, and incorporating successful solutions into the workflow. Over time, workflows may be refined continuously to improve their reliability and adaptability, ensuring that the system remains effective in handling a wide range of tasks.

Aspects of the subject matter described in this disclosure can be implemented to realize one or more of the following potential advantages. The described techniques may be implemented to support scalable and adaptive task execution across diverse computing environments, enabling systems to dynamically adjust workflows based on contextual factors such as resource availability, user preferences, or operational constraints. The system may enhance operational efficiency by leveraging modular components that can interact seamlessly with various software interfaces, ensuring compatibility with a wide range of platforms and configurations. By incorporating mechanisms for real-time monitoring and error recovery, the system may improve reliability and reduce downtime during task execution. The described approaches may facilitate secure and compliant automation by enforcing policies that align with organizational or regulatory requirements, thereby mitigating risks associated with unauthorized or unintended actions. The system may empower users by providing intuitive interfaces and actionable insights, fostering a productive and user-friendly computing experience.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to automating code analysis, dependency mapping, and adaptive task execution with AI.

FIG. 1 illustrates an example of a system 100 that supports automating code analysis, dependency mapping, and adaptive task execution with AI in accordance with various aspects of the present disclosure. The system 100 includes cloud clients 102, user devices 104, a cloud platform 106, and a data center 108. Cloud platform 106 may be an example of a public or private cloud network. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a wearable device (e.g., cloud client 102-a), a smartphone (e.g., cloud client 102-b), or a server (e.g., cloud client 102-c). In other examples, a cloud client 102 may be a desktop or laptop computer, a tablet, a sensor, or another computing device or system capable of generating, analyzing, transmitting, or receiving communications. In some examples, a cloud client 102 may be part of a business, an enterprise, a non-profit, a startup, or any other organization type.

A cloud client 102 may facilitate communication between the data center 108 and one or multiple user devices 104 to implement an online environment. The network connection 112 may include communications, opportunities, purchases, sales, or any other interaction between a cloud client 102 and a user device 104. The network connection 112 may include a wired connection, a wireless connection, or both. A cloud client 102 may access cloud platform 106 to store, manage, and process the data communicated via one or more network connections 112. In some cases, the cloud client 102 may have an associated security or permission level. A cloud client 102 may have access to certain applications, data, and database information within cloud platform 106 based on the associated security or permission level, and may not have access to others.

The user device 104 may include an adaptive automation component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-a, 112-b, 112-c, and 112-d) via a computer network. In an example, the user device 104 may be computing device such as a wearable device 104-a, a smartphone 104-b, a laptop 104-c or a server 104-d. In other cases, the user device 104 may be another computing system. In some cases, the user device 104 may be operated by a user or group of users. The user or group of users may be a customer, associated with a business, a manufacturer, or any other appropriate organization.

Cloud platform 106 may offer an on-demand database service to the cloud client 102. In some cases, cloud platform 106 may be an example of a multi-tenant database system. In this case, cloud platform 106 may serve multiple cloud clients 102 with a single instance of software. However, other types of systems may be implemented, including—but not limited to—client-server systems, mobile device systems, and mobile network systems. In some cases, cloud platform 106 may support an online application. This may include support for sales between buyers and sellers operating user devices 104, service, marketing of products posted by buyers, community interactions between buyers and sellers, analytics, such as user-interaction metrics, applications (e.g., computer vision and machine learning), and the Internet of Things (IoT). Cloud platform 106 may receive data associated with generation of an online environment from the cloud client 102 over network connection 114, and may store and analyze the data. In some cases, cloud platform 106 may receive data directly from a user device 104 and the cloud client 102. In some cases, the cloud client 102 may develop applications to run on cloud platform 106. Cloud platform 106 may be implemented using remote servers. In some cases, the remote servers may be located at one or more data centers 108.

Data center 108 may include multiple servers. The multiple servers may be used for data storage, management, and processing. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes. In some cases, the data stored at data center 108 may be backed up by copies of the data at a different data center (not pictured).

Server system 110 may include cloud clients 102, a cloud platform 106, an adaptive automation component 118, and a data center 108 that may coordinate with cloud platform 106 and data center 108 to implement an online environment. In some cases, data processing may occur at any of the components of server system 110, or at a combination of these components. Thus, the adaptive automation component 118 may be included in the user device 104, server system 110, or in part or in whole in both. In some cases, servers may perform the data processing. The servers may be a cloud client 102 or located at data center 108.

Some or all of the functionality attributed to the adaptive automation component 118 may be embodied or performed by one or more user devices 104, one or more components of server system 110 (e.g., cloud clients 102, a cloud platform 106, and/or a data center 108), and/or other components of system 100. The adaptive automation component 118 may receive signals and inputs from user device 104 directly. via cloud clients 102, and/or via cloud platform 106 or data center 116.

As described herein, the adaptive automation component 118 may leverage AI to parse input data received from user devices 110 or cloud clients 102, extracting task parameters and generating meta tags that describe functions and dependencies within the data. The component may construct workflow representations that include operating-system-level input events and associated state transitions, which may be executed by generating the input events and verifying state transitions through a perception layer. The perception layer may capture pre-execution and post-execution states to ensure accurate task execution. Additionally, the adaptive automation component 118 may log each executed input event and corresponding state transition in a provenance module, which may include cryptographic metadata to enable secure and auditable task tracking.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
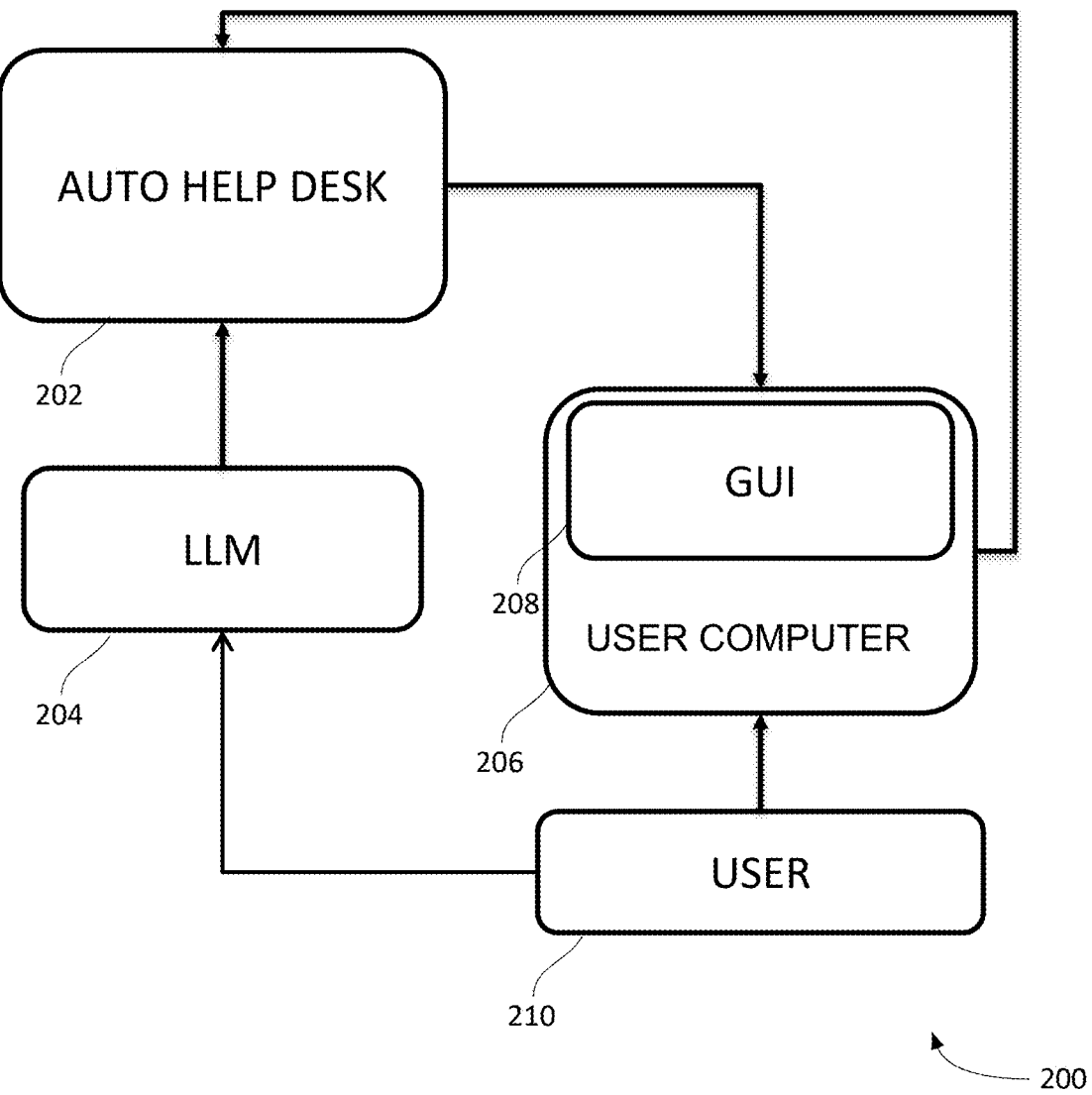
FIG. 2 illustrates an example of a system interaction diagram which supports techniques for automating code analysis, dependency mapping, and adaptive task execution with AI in accordance with various aspects of the present disclosure.

FIG. 2 shows system interaction diagram 200 which supports techniques for automating code analysis, dependency mapping, and adaptive task execution with AI in accordance with various aspects of the present disclosure. As depicted in FIG. 2, the system interaction diagram 200 may include one or more of an auto help desk 202, an LLM 204, a user computer 206, a GUI 208, a user 210, and/or other components.

The auto help desk 202 may include features for interacting with various system components to generate autonomous actions. The auto help desk 202 may include software modules configured to interpret user inputs and execute predefined workflows. The auto help desk 202 may interact with external databases or APIs to retrieve relevant information for task execution. The auto help desk 202 may communicate with the LLM 204 to process complex queries and generate context-aware responses. In some implementations, the auto help desk 202 may include alternative configurations, such as cloud-based or on-premises deployments.

The LLM 204 may represent a machine learning model capable of processing natural language inputs and generating context-aware outputs. The LLM 204 may include pre-trained neural network architectures designed to understand and respond to user queries. The LLM 204 may process textual data to determine intent and generate appropriate responses. The LLM 204 may interact with the auto help desk 202 to provide natural language understanding and task execution capabilities. In some implementations, the LLM 204 may include alternative models, such as transformer-based architectures or recurrent neural networks.

The user computer 206 may include hardware and software components configured to interact with the auto help desk 202 and the GUI 208. The user computer 206 may include input devices, such as keyboards and mice, and output devices, such as monitors and speakers. The user computer 206 may execute client-side applications that facilitate communication with the auto help desk 202. The user computer 206 may connect to the auto help desk 202 over a network to send and receive data. In some implementations, the user computer 206 may include alternative devices, such as tablets or smartphones.

The GUI 208 may provide an interface for displaying information and receiving inputs from the user 210. The GUI 208 may include visual elements, such as buttons, text fields, and menus, to facilitate user interaction. The GUI 208 may display task progress, system notifications, and other relevant information to the user 210. The GUI 208 may communicate with the user computer 206 to render dynamic content based on user actions. In some implementations, the GUI 208 may include alternative designs, such as voice-controlled interfaces or augmented reality displays.

The user 210 may interact with the system through the GUI 208 to initiate tasks or provide feedback. The user 210 may input commands or queries into the GUI 208 to request specific actions or information. The user 210 may review outputs generated by the auto help desk 202 and provide additional inputs as needed. The user 210 may rely on the GUI 208 to navigate through various system functionalities. In some implementations, the user 210 may include alternative roles, such as administrators or support staff.

In some implementations, the auto help desk 202 may interact with the LLM 204 to process user inputs and generate corresponding actions or responses. The user computer 206 may serve as the interface through which the auto help desk 202 communicates with the user 210, with the GUI 208 acting as the visual layer for displaying task progress and receiving user commands. The LLM 204 may analyze natural language inputs from the user 210 and transmit structured data or instructions to the auto help desk 202 for task execution.

In some implementations, the auto help desk 202 may generate operating-system-level input events and transmit them to the user computer 206, where the GUI 208 may reflect the resulting state transitions. The user 210 may interact with the GUI 208 to provide feedback or initiate additional tasks, which may be relayed back to the auto help desk 202 for further processing. The LLM 204 may continuously refine its understanding of user inputs and collaborate with the auto help desk 202 to adapt workflows based on real-time interactions.

In some embodiments, a collaborative framework may be implemented where multiple LLMs and GANs analyze each step of a task, form a consensus, and proceed to the next step. Multiple LLMs may be configured to analyze the user input or system command in parallel, while multiple GANs collaborate on generating visual content or media. A consensus engine may be used to compare results from different LLMs and GANs to ensure correctness before proceeding. After consensus is reached, the system moves forward with executing the next task in the process.

In various embodiments, a system integrates multiple LLMs and GANs to form a consensus at each step of task execution for improved accuracy. When the source code is available, the system can leverage it, along with FAQs and other documentation, to train the one or more AIs for generating a complete help desk and task execution automation. The availability of both code and user documentation allows for a more comprehensive and contextually aware AI model, which can assist users with intricate software tasks and provide highly accurate guidance.

The system may first ingest the entire source code, including relevant user-facing documentation like FAQs, help files, and user guides. The one or more LLM is fine-tuned using the combination of source code and user documentation, improving the model's understanding of both the software's internal workings (through the code) and its user-facing behaviors (through FAQs and help files). During the source code analysis, the system generates meta tags that describe function purposes, parameters, and dependencies. These meta tags, combined with FAQs, allow the AI to provide contextual responses based on both technical and user-friendly information. The AI uses the data gathered from both the source code and the FAQs to generate a comprehensive help desk capable of answering both technical questions and user-facing queries. The AI is trained to understand task flows from both the source code and documentation, enabling it to automate task execution and assist users in completing tasks via the help desk interface.

In alternative situations the source code may be unavailable. In such a situation, the system can still generate a comprehensive help desk and provide task execution automation by allowing the bot to navigate the software interface autonomously. The bot can simulate user actions (e.g., clicking buttons, filling forms), capture screenshots, and interact with LLMs and GANs to build a detailed understanding of the software's workflows and functionality.

Figure 3:
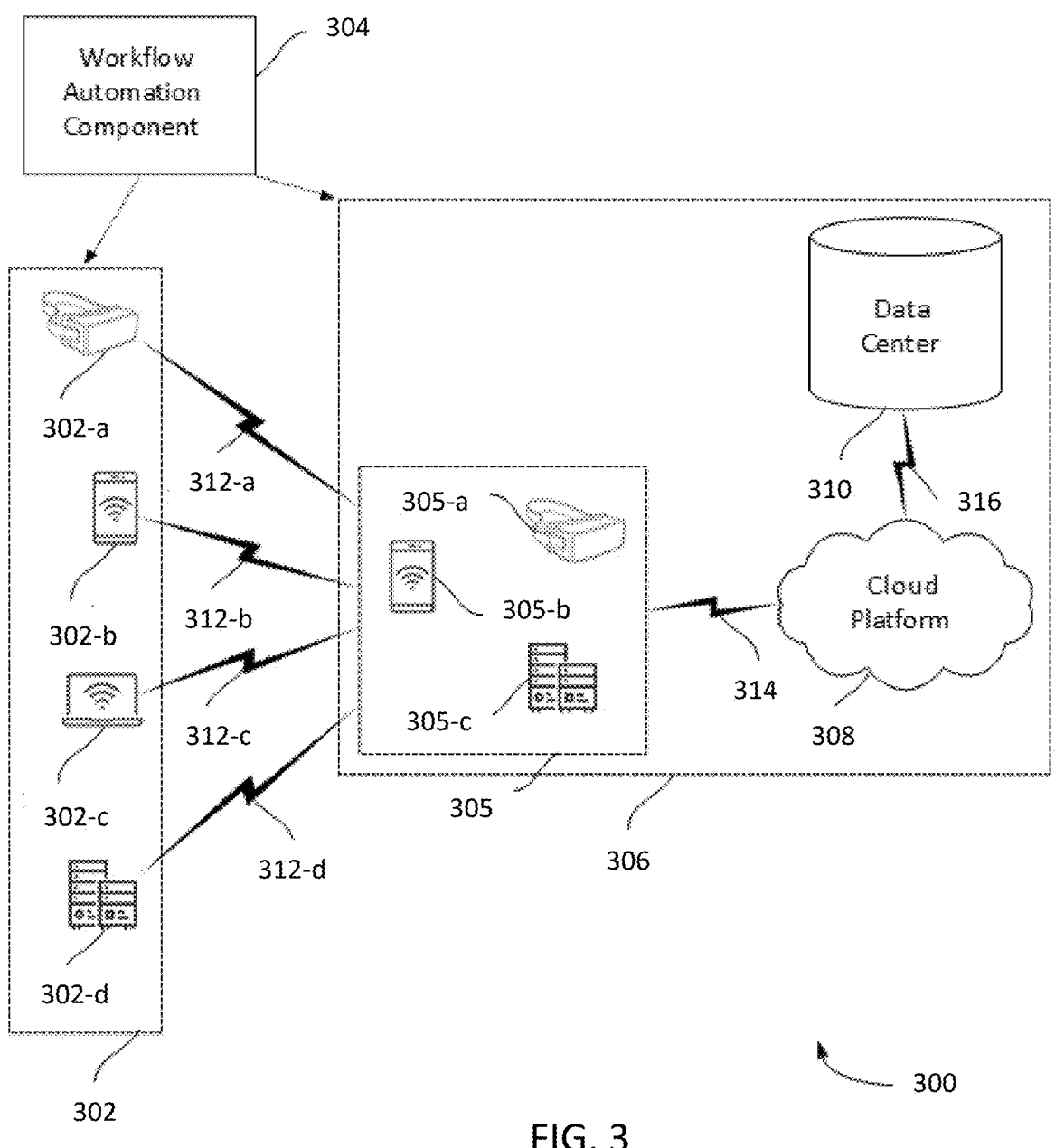
FIG. 3 illustrates an alternative example of a networked computing system which supports techniques for automating code analysis, dependency mapping, and adaptive task execution with AI in accordance with various aspects of the present disclosure.

When a codebase and documentation are not available or are only partially available, the bot autonomously performs clicks, scrolls, and input submissions to explore task flows (e.g., how to create a report, input data, generate invoices, etc.). As the bot navigates through the software, it captures screenshots and tracks system states (e.g., before and after submitting a form, when a confirmation window appears). The bot consults an LLM to analyze screen captures, extract meaning, and identify the appropriate next steps in the user journey. GANs generate visual diagrams, such as flowcharts, mapping out the task flows the bot has discovered. The system generates a complete help desk with step-by-step guidance for each task based on the task flows discovered by the bot. The system dynamically adjusts its approach by analyzing error messages using the LLM and proposing new actions. The bot learns from errors, ensuring smoother workflows in future executions FIG. 3 shows networked computing system 300 which supports techniques for automating code analysis, dependency mapping, and adaptive task execution with AI in accordance with various aspects of the present disclosure. As depicted in FIG. 3, the networked computing system 300 may include one or more of a wireless device 302, a workflow automation component 304, a server platform 306, a cloud platform 308, a data center 310, and/or other components.

The wireless device 302 may represent a user-operated device capable of transmitting and receiving data within the networked computing system. The wireless device 302 may include hardware components such as antennas, transceivers, and processors that enable communication over various network protocols. The wireless device 302 may support multiple communication modalities, including Wi-Fi, Bluetooth, and cellular networks, to interact with other components in the system. In some implementations, the wireless device 302 may exchange data with the workflow automation component 304 or the server platform 306 to initiate or monitor workflows. Examples of the wireless device 302 may include wearable devices (302-*a*), smartphones (302-*b*), laptops (302-*c*), computer servers (302-*d*), tablets, or other devices.

The workflow automation component 304 may include hardware and software configured to construct and execute workflows based on input data. The workflow automation component 304 may include modules for parsing input data, generating workflow representations, and executing tasks through operating-system-level input events. The workflow automation component 304 may interact with the perception layer to verify state transitions during task execution. In some implementations, the workflow automation component 304 may communicate with the server platform 306 to receive task parameters or send execution feedback. Examples of the workflow automation component 304 may include standalone software applications, cloud-based services, or embedded systems.

The server platform 306 may include processing units and memory designed to parse input data and manage task execution workflows. The server platform 306 may store instructions for analyzing input data, extracting task parameters, and constructing workflow representations. The server platform 306 may interact with the provenance module to log executed input events and corresponding state transitions with cryptographic metadata. In some implementations, the server platform 306 may transmit workflow representations to the workflow automation component 304 for execution. Examples of the server platform 306 may include physical servers, virtual machines, or distributed computing clusters. Virtual machines may represent various cloud clients 305, such as but not limited to wearables (305-*a*), mobile phones (305-*b*), computer servers (305-*c*), and other computing devices.

The cloud platform 308 may represent a distributed computing environment that supports data storage and processing for connected devices. The cloud platform 308 may include scalable resources such as virtual servers, databases, and storage systems to handle large volumes of data. The cloud platform 308 may facilitate communication between the wireless device 302, the workflow automation component 304, and the server platform 306. In some implementations, the cloud platform 308 may host the workflow automation component 304 or the server platform 306 to enable remote access and task execution. Examples of the cloud platform 308 may include public cloud services, private cloud infrastructures, or hybrid cloud environments.

The data center 310 may include multiple servers configured to store, manage, and process data for the networked computing system. The data center 310 may include redundant systems to ensure reliability and secure storage for sensitive information. The data center 310 may support the operations of the cloud platform 308 by hosting its physical infrastructure. In some implementations, the data center 310 may directly interact with the server platform 306 to process workflows or store provenance logs. Examples of the data center 310 may include enterprise data centers, colocation facilities, or edge computing nodes.

In some implementations, the wireless device 302 may communicate with the workflow automation component 304 to transmit input data representing computer issues or task parameters. The workflow automation component 304 may interact with the server platform 306 to parse the input data and construct workflow representations that include operating-system-level input events and associated state transitions. The server platform 306 may relay these workflows to the cloud platform 308, which may execute the workflows by generating input events and verifying state transitions through a perception layer.

In some implementations, the cloud platform 308 may store cryptographic metadata related to executed input events and state transitions in the data center 310. The data center 310 may maintain a secure repository for provenance logs, which may include timestamps, application identifiers, and encrypted state change information. The wireless device 302 may access these logs through authenticated protocols to review task execution details or audit trails.

Figure 4:
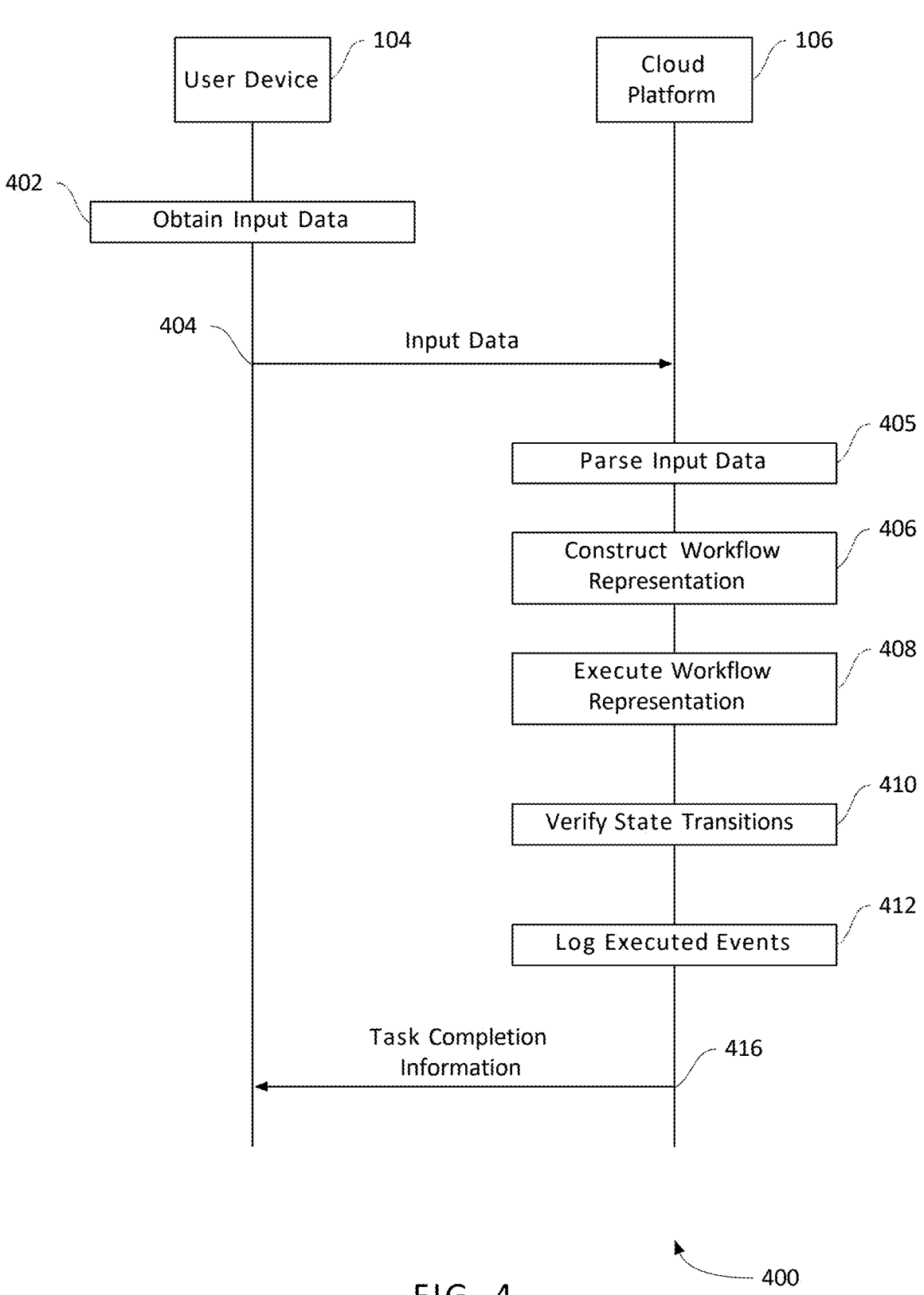
FIG. 4 illustrates a labeled flowchart that supports techniques for automating code analysis, dependency mapping, and adaptive task execution with AI in accordance with various aspects of the present disclosure.

FIG. 4 illustrates a labeled flowchart 400 that supports techniques for automating code analysis, dependency mapping, and adaptive task execution with AI in accordance with various aspects of the present disclosure. Operations illustrated in the labeled flowchart 400 may involve the user device 104, the cloud platform 106, and/or other participants, which may be examples of corresponding devices described herein. The labeled flowchart 400 may describe a process for obtaining input data, parsing it to construct a workflow representation, executing the workflow, verifying state transitions, and logging events for auditability.

At 402, the user device may obtain input data representing one or more computer issues. In some implementations, the user device 104 may receive textual descriptions of computer issues entered by a user through a keyboard or touchscreen interface. In some implementations, the user device 104 may capture audio input from the user describing the computer issues, which may then be processed to extract relevant details. In some implementations, the user device 104 may accept image or video uploads that depict error messages or problematic system behaviors. In some implementations, the user device 104 may collect system logs or diagnostic data automatically generated by the software to represent the computer issues.

At 404, the cloud platform may parse the input data to determine task parameters. In some implementations, the cloud platform 106 may analyze textual descriptions to identify keywords or phrases that correspond to specific tasks or actions. In some implementations, the cloud platform 106 may process audio input by converting it into text and identifying task-related parameters from the transcribed content. In some implementations, the cloud platform 106 may examine image or video data to detect visual elements, such as error messages or interface components, that indicate relevant task parameters. In some implementations, the cloud platform 106 may analyze system logs to extract event codes or messages that correspond to specific task parameters.

At 405, the input data may be parsed, including by use of one or more LLMs. At 406, the cloud platform may construct a workflow representation of tasks based on the task parameters. In some implementations, the cloud platform 106 may determine dependencies between tasks and represent them as directed edges in a state graph, where nodes correspond to specific GUI states or system configurations. In some implementations, the cloud platform 106 may incorporate error-handling pathways into the workflow representation, such as alternative state transitions triggered upon detecting unexpected system responses. In some implementations, the cloud platform 106 may annotate the workflow representation with metadata, such as timestamps or user-specific preferences, that influence the execution of tasks. In some implementations, the cloud platform 106 may generate sequences of operating-system-level input events that correspond to the identified tasks.

At 408, the cloud platform may execute the workflow representation by generating operating-system-level input events. In some implementations, the cloud platform 106 may simulate cursor movements to interact with graphical user interface elements, such as clicking a button or entering text into a form field. In some implementations, the cloud platform 106 may issue commands to adjust system settings, such as modifying network configurations or managing file permissions, by triggering specific input events. In some implementations, the cloud platform 106 may generate sequences of input events to navigate through multi-step processes, such as completing a software installation or configuring application preferences. In some implementations, the cloud platform 106 may simulate mouse clicks to confirm user prompts or interact with dialog boxes.

At 410, the cloud platform may verify state transitions through a perception layer to determine task completion. In some implementations, the cloud platform 106 may compare pre-action and post-action screenshots to determine whether a graphical user interface element has changed state as expected. In some implementations, the cloud platform 106 may analyze accessibility tree snapshots to detect modifications in roles, states, or attributes associated with user interface components. In some implementations, the cloud platform 106 may employ optical character recognition to extract text from captured images and determine whether specific error messages or confirmation prompts are present. In some implementations, the cloud platform 106 may monitor system logs for specific event codes or messages that correspond to successful task execution.

At 412, the cloud platform may log each executed input event and corresponding state transition in a provenance module with cryptographic metadata. In some implementations, the cloud platform 106 may store a hash of the input event alongside a timestamp and a unique identifier for the associated state transition. In some implementations, the cloud platform 106 may include user-specific metadata, such as session identifiers or access permissions, to contextualize the logged events. In some implementations, the cloud platform 106 may record pre-action and post-action state snapshots to enable detailed tracking of system behavior. In some implementations, the cloud platform 106 may store the cryptographic metadata in a distributed ledger to support decentralized auditability. In some instances Task Completion Information 416 may be communicated to user device 104.

Figure 5:
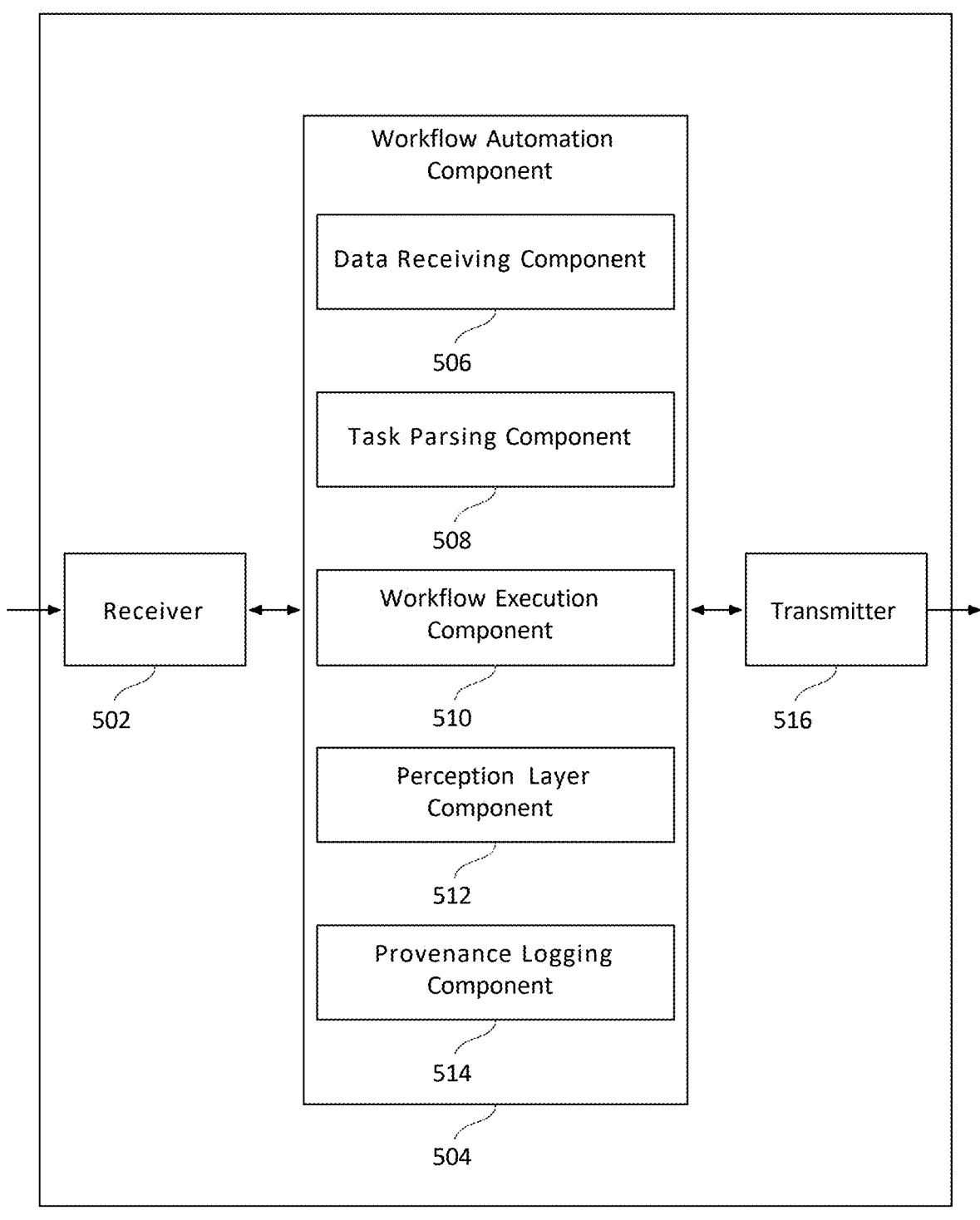
FIG. 5 illustrates an example of a system architecture diagram which supports techniques for automating code analysis, dependency mapping, and adaptive task execution with AI in accordance with various aspects of the present disclosure.

FIG. 5 shows system architecture diagram 500 which supports techniques for automating code analysis, dependency mapping, and adaptive task execution with AI in accordance with various aspects of the present disclosure. As depicted in FIG. 5, the system architecture diagram 500 may include one or more of a receiver 502, a workflow automation component 504, a data receiving component 506, a task parsing component 508, a workflow execution component 510, a perception layer component 512, a provenance logging component 514, a transmitter 516, and/or other components.

The receiver 502 may manage input signals for the system architecture diagram 500. The receiver 502 may handle input signals originating from various sources, such as user devices, external systems, or internal components. The receiver 502 may process these signals to determine their type, format, and relevance to the system's operations. The receiver 502 may interact with other components, such as the workflow automation component 504, to relay processed signals for further task execution. In some implementations, the receiver 502 may be similar to a modem, a keyboard, or a touchscreen interface, as described herein.

The workflow automation component 504 may include multiple subcomponents to support task execution and management. In some implementations, the workflow automation component 504 may be the same as or similar to the workflow automation component 304, as described herein.

The data receiving component 506 may handle incoming data representing various inputs for processing. The data receiving component 506 may accept input data in multiple formats, such as text, images, or audio, depending on the source of the input. The data receiving component 506 may determine the relevance of the incoming data to specific tasks or workflows within the system. The data receiving component 506 may interact with the task parsing component 508 to transmit processed data for further analysis. In some implementations, the data receiving component 506 may be similar to a wireless device 302 or a user computer 206, as described herein.

The task parsing component 508 may determine task parameters and construct workflow representations based on the received data. The task parsing component 508 may analyze input data to identify keywords, patterns, or visual elements that correspond to actionable tasks. The task parsing component 508 may construct workflow representations by mapping identified parameters to predefined templates or generating sequences of operating-system-level input events. The task parsing component 508 may interact with the workflow execution component 510 to transmit constructed workflows for execution. In some implementations, the task parsing component 508 may be similar to step 404 or step 406, as described herein.

The workflow execution component 510 may generate operating-system-level input events to execute tasks. The workflow execution component 510 may simulate user actions, such as cursor movements, keystrokes, or mouse clicks, to interact with graphical user interfaces. The workflow execution component 510 may determine the sequence of input events required to complete multi-step processes or workflows. The workflow execution component 510 may interact with the perception layer component 512 to verify the success of executed tasks. In some implementations, the workflow execution component 510 may be similar to step 408 or step 410, as described herein.

The perception layer component 512 may verify state transitions by analyzing system states before and after task execution. The perception layer component 512 may capture screenshots, accessibility tree snapshots, or document object model attributes to determine changes in system states. The perception layer component 512 may determine whether the intended effects of executed tasks have been achieved by comparing pre-execution and post-execution data. The perception layer component 512 may interact with the provenance logging component 514 to record verified state transitions. In some implementations, the perception layer component 512 may be similar to step 412 or the GUI 208, as described herein.

The provenance logging component 514 may record executed input events and corresponding state transitions with cryptographic metadata. The provenance logging component 514 may generate timestamps, unique identifiers, and hashes for each logged event to ensure data integrity. The provenance logging component 514 may determine the context of logged events, such as the active window or process identifier, to support auditability. The provenance logging component 514 may interact with the transmitter 516 to relay logged data to external systems or components.

In some implementations, the provenance logging component 514 may be similar to the server platform 306 or the cloud platform 308, as described herein.

The transmitter 516 may manage output signals for communication with other components or external systems. The transmitter 516 may determine the format and destination of output signals based on the requirements of the receiving components or systems. The transmitter 516 may relay processed data, task execution results, or logged events to external systems for further analysis or storage. The transmitter 516 may interact with the workflow automation component 504 to ensure seamless communication within the system. In some implementations, the transmitter 516 may be similar to the auto help desk 202 or the data center 310, as described herein.

In some implementations, the receiver 502 may receive input data representing one or more computer issues and may transmit the data to the workflow automation component 504. The workflow automation component 504 may include a data receiving component 506 that may process the input data and a task parsing component 508 that may extract task parameters and construct a workflow representation. The workflow execution component 510 may execute the constructed workflow by generating operating-system-level input events and interacting with the perception layer component 512 to verify state transitions during task execution.

In some implementations, the perception layer component 512 may capture pre-execution and post-execution states of the graphical user interface and may compare these states to determine whether the task transitions align with the expected workflow. The provenance logging component 514 may log the executed input events and corresponding state transitions, embedding cryptographic metadata to maintain a secure and verifiable audit trail. The transmitter 516 may communicate the results of the workflow execution, including any logged data, to external systems or user interfaces for further analysis or review.

Figure 6:
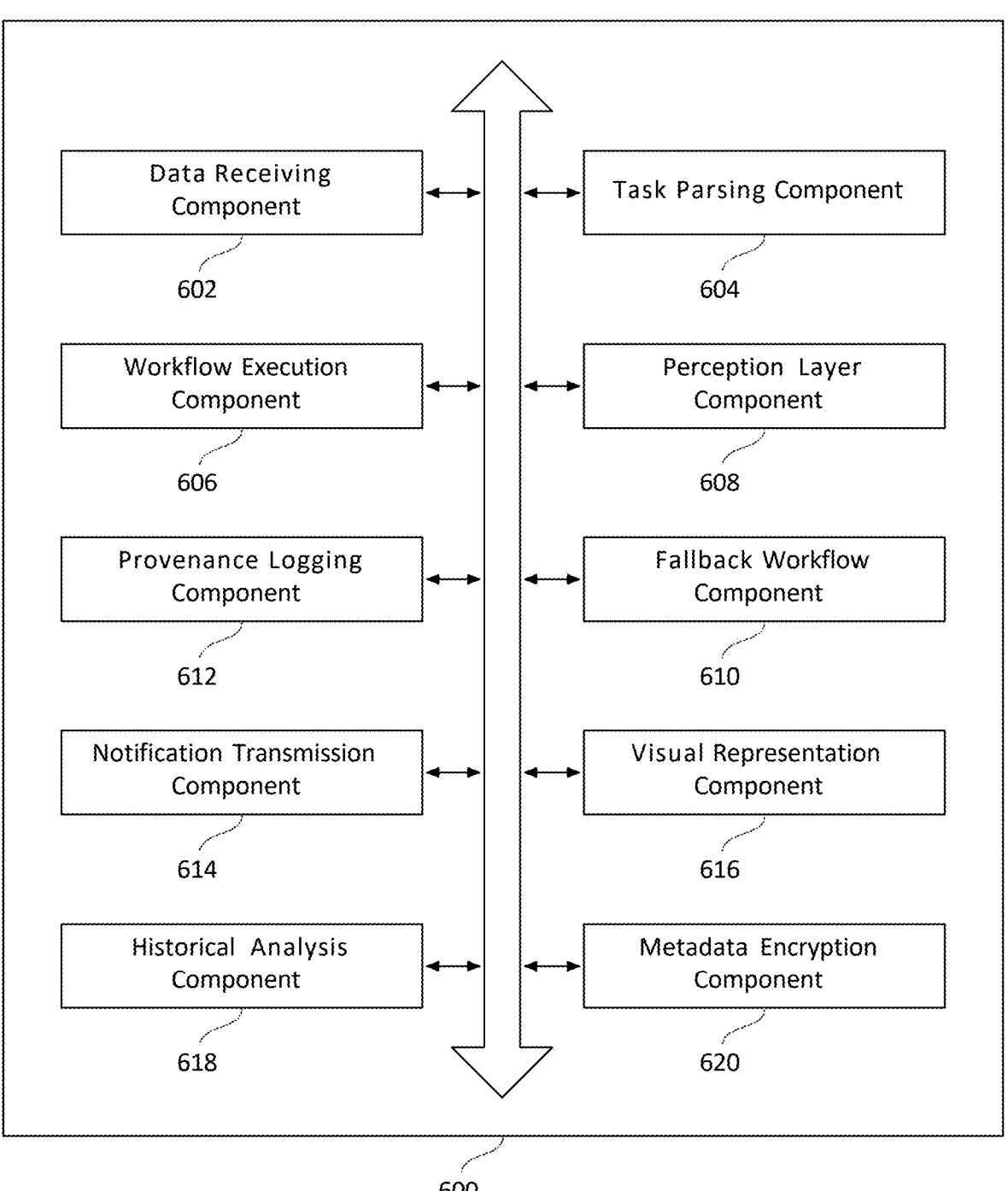
FIG. 6 illustrates an example of a system architecture diagram which supports techniques for automating code analysis, dependency mapping, and adaptive task execution with AI in accordance with various aspects of the present disclosure.

FIG. 6 shows system architecture diagram 600 which supports techniques for automating code analysis, dependency mapping, and adaptive task execution with AI in accordance with various aspects of the present disclosure. As depicted in FIG. 6, the system architecture diagram 600 may include one or more of a data receiving component 602, a task parsing component 604, a workflow execution component 606, a perception layer component 608, a fallback workflow component 610, a provenance logging component 612, a notification transmission component 614, a visual representation component 616, a historical analysis component 618, a metadata encryption component 620, and/or other components.

The data receiving component 602 may include mechanisms to accept input data representing various computer issues. In some implementations, the data receiving component 602 may be the same as or similar to the data receiving component 506, receiver 502, or server platform 306, as described herein.

The task parsing component 604 may analyze the input data to determine task parameters and construct workflow representations. In some implementations, the task parsing component 604 may be the same as or similar to the task parsing component 508, workflow automation component 304, or workflow automation component 504, as described herein.

The workflow execution component 606 may generate operating-system-level input events to execute the constructed workflows. In some implementations, the workflow execution component 606 may be the same as or similar to the workflow execution component 510, workflow automation component 304, or workflow automation component 504, as described herein.

The perception layer component 608 may monitor and verify state transitions during workflow execution. In some implementations, the perception layer component 608 may be the same as or similar to the perception layer component 512, workflow automation component 304, or workflow automation component 504, as described herein.

The fallback workflow component 610 may determine alternative workflows in response to detected failures in state transitions. The fallback workflow component 610 may include mechanisms to analyze historical execution logs to determine alternative input events. The fallback workflow component 610 may determine alternative workflows by referencing predefined templates that may correspond to recovery scenarios. The fallback workflow component 610 may determine alternative workflows by consulting a knowledge graph that may store relationships between system states and input events. In some implementations, the fallback workflow component 610 may include mechanisms to generate fallback workflows that bypass problematic state transitions.

The provenance logging component 612 may record executed input events and corresponding state transitions with cryptographic metadata. In some implementations, the provenance logging component 612 may be the same as or similar to the provenance logging component 514, workflow automation component 304, or workflow automation component 504, as described herein.

The notification transmission component 614 may transmit notifications containing metadata and summaries of state transitions to remote client devices. The notification transmission component 614 may include mechanisms to transmit notifications as text messages containing descriptions of logged input events. The notification transmission component 614 may transmit notifications as email attachments that include detailed reports of state transitions. The notification transmission component 614 may transmit notifications as push notifications to mobile applications that display summaries of input events. In some implementations, the notification transmission component 614 may include mechanisms to transmit notifications securely to authorized client devices.

The visual representation component 616 may generate graphical depictions of workflows, including input events and state transitions. The visual representation component 616 may include mechanisms to depict input events as icons or symbols arranged in sequences. The visual representation component 616 may generate color-coded state transitions to distinguish successful transitions from errors. The visual representation component 616 may render workflows as flowcharts with nodes representing states and edges representing input events. In some implementations, the visual representation component 616 may include mechanisms to annotate graphical depictions with labels describing input events and state transitions.

The historical analysis component 618 may analyze logged data to identify recurring failures and determine preemptive modifications to workflows. The historical analysis component 618 may include mechanisms to analyze cryptographic metadata associated with logged input events to identify patterns. The historical analysis component 618 may analyze timestamps within the provenance module to detect correlations between failures and system states. The historical analysis component 618 may determine preemptive modifications by referencing predefined templates for recovery scenarios. In some implementations, the historical analysis component 618 may include mechanisms to update workflows with fallback paths addressing recurring failures.

The metadata encryption component 620 may encrypt cryptographic metadata with keys generated by a secure key management system. The metadata encryption component 620 may include mechanisms to encrypt metadata using symmetric encryption algorithms such as AES or DES. The metadata encryption component 620 may generate unique encryption keys for different workflows stored securely within the key management system. The metadata encryption component 620 may restrict access to encrypted metadata based on user roles or workflow permissions. In some implementations, the metadata encryption component 620 may include mechanisms to support time-limited access to encrypted metadata requiring re-authentication.

In some implementations, the data receiving component 602 may interface with external systems to ingest input data representing computer issues, which may then be forwarded to the task parsing component 604 for extracting task parameters and constructing workflow representations. The workflow execution component 606 may interact with the perception layer component 608 to generate operating-system-level input events and verify state transitions during task execution. The fallback workflow component 610 may activate alternative execution paths when errors or discrepancies are detected by the perception layer component 608.

In some implementations, the provenance logging component 612 may record metadata associated with executed input events and state transitions, while the metadata encryption component 620 may secure this information using cryptographic techniques. The notification transmission component 614 may relay updates about task progress or completion to external systems or users. The visual representation component 616 may generate graphical outputs, such as flowcharts or dependency graphs, based on the workflows constructed by the task parsing component 604. The historical analysis component 618 may analyze previously logged data to determine patterns or trends that inform predictive task suggestions.

Figure 7:
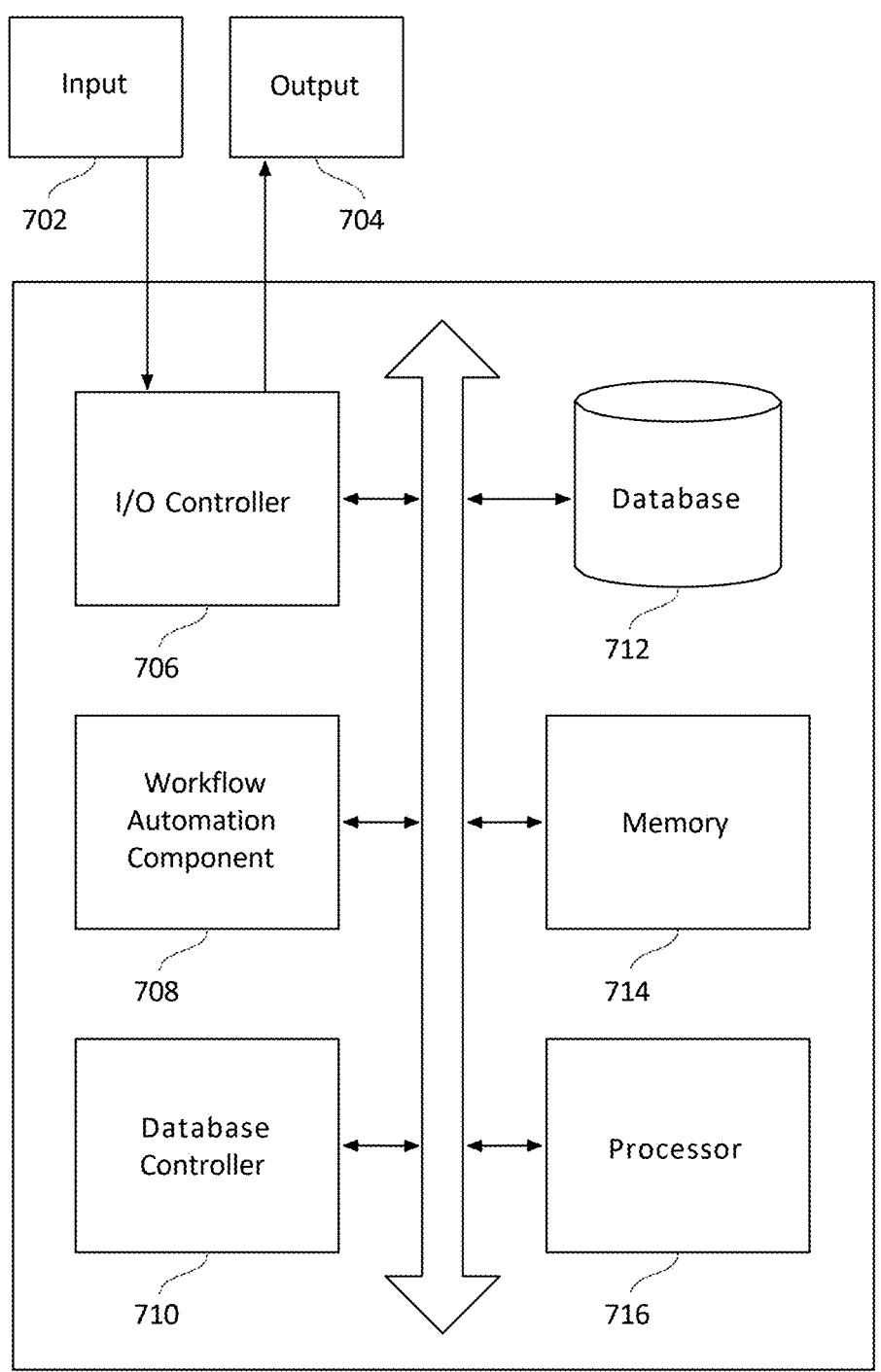
FIG. 7 illustrates an example of a system architecture diagram which supports techniques for automating code analysis, dependency mapping, and adaptive task execution with AI in accordance with various aspects of the present disclosure.

FIG. 7 shows system architecture diagram 700 which supports techniques for automating code analysis, dependency mapping, and adaptive task execution with AI in accordance with various aspects of the present disclosure. As depicted in FIG. 7, the system architecture diagram 700 may include one or more of an input 702, an output 704, an I/O controller 706, a workflow automation component 708, a database controller 710, a database 712, a memory 714, a processor 716, and/or other components.

The input 702 may include mechanisms for receiving data from external sources or user interactions. The input 702 may include hardware components such as sensors, keyboards, or microphones that may capture user inputs or environmental data. The input 702 may determine signals or data streams from connected devices or systems. In some implementations, the input 702 may interact with the I/O controller 706 to manage the flow of incoming data. The input 702 may include alternatives such as touchscreens, cameras, or voice recognition systems.

The output 704 may include components for transmitting processed data or results to connected systems or devices. The output 704 may include hardware such as display screens, speakers, or network interfaces that may present or transmit information. The output 704 may determine the appropriate format for delivering data based on the connected device or system. In some implementations, the output 704 may interact with the I/O controller 706 to coordinate outgoing signals. The output 704 may include alternatives such as printers, projectors, or wireless communication modules.

The I/O controller 706 may represent a module for managing input and output signals between various components of the system. The I/O controller 706 may include circuitry or software that may regulate the flow of data to and from the input 702 and output 704. The I/O controller 706 may determine signal compatibility and timing to ensure proper communication between components. In some implementations, the I/O controller 706 may interact with the processor 716 to process and route signals. The I/O controller 706 may include alternatives such as USB controllers, serial communication interfaces, or wireless transceivers.

The workflow automation component 708 may include functionalities for constructing and executing task workflows based on input parameters. In some implementations, the workflow automation component 708 may be the same as or similar to the workflow automation component 304 and/or workflow automation component 504, as described herein.

The database controller 710 may represent a system for managing access to and operations within the database 712. The database controller 710 may include software or hardware that may regulate data retrieval, storage, and updates. The database controller 710 may determine access permissions and query optimization for efficient data handling. In some implementations, the database controller 710 may interact with the memory 714 to cache frequently accessed data. The database controller 710 may include alternatives such as distributed database management systems or cloud-based database controllers.

The database 712 may include storage for structured or unstructured data used by the system. The database 712 may include physical or virtual storage media that may retain data for long-term or temporary use. The database 712 may determine the organization of data into tables, files, or other formats for efficient retrieval. In some implementations, the database 712 may interact with the database controller 710 to manage data integrity and consistency. The database 712 may include alternatives such as relational databases, NoSQL databases, or object-oriented databases.

The memory 714 may include storage for instructions, temporary data, or other information required by the processor 716. The memory 714 may include volatile or non-volatile storage that may retain data during system operation. The memory 714 may determine the allocation of space for program execution and data storage. In some implementations, the memory 714 may interact with the processor 716 to load and execute instructions. The memory 714 may include alternatives such as RAM, ROM, or flash memory.

The processor 716 may include hardware for executing instructions and managing operations across the system components. The processor 716 may include one or more cores that may perform parallel processing tasks. The processor 716 may determine the sequence of operations based on the instructions stored in the memory 714. In some implementations, the processor 716 may interact with the workflow automation component 708 to execute task workflows. The processor 716 may include alternatives such as general-purpose processors, application-specific integrated circuits (ASICs), or field-programmable gate arrays (FPGAs).

In some implementations, the input 702 may transmit data representing user commands or system events to the I/O controller 706, which may manage the flow of information between the input 702 and other components. The I/O controller 706 may communicate with the workflow automation component 708 to interpret the input data and determine corresponding operating-system-level input events. The workflow automation component 708 may interact with the processor 716 to execute these events and verify state transitions through the perception layer.

In some implementations, the database controller 710 may facilitate access to the database 712, which may store meta tags, dependency graphs, cryptographic provenance logs, and other workflow-related data. The memory 714 may temporarily hold task parameters and intermediate processing results, enabling the processor 716 to perform operations such as parsing input data, constructing workflows, and generating predictive task suggestions. The output 704 may display the results of these operations, including visualizations generated by GANs or real-time feedback from the multi-modal help desk engine.

FIG. 8 illustrates a labeled flowchart 800 that supports techniques for automating code analysis, dependency mapping, and adaptive task execution with AI in accordance with various aspects of the present disclosure. Operations illustrated in the labeled flowchart 800 may involve a user device, a cloud platform, an input, an output, an I/O controller, and a workflow automation component, which may be examples of corresponding devices described herein. The labeled flowchart 800 may describe a process for receiving input data, parsing it to construct workflows, executing tasks through system-level events, and logging actions with cryptographic metadata for verification and auditability.

At 802, the cloud platform may receive input data representing one or more computer issues from the user device. In some implementations, the input data may include textual descriptions of the computer issues entered by the user through a keyboard or touchscreen interface on the user device 104. In some implementations, the input data may consist of audio recordings captured by the user device 104, which may be converted into text for further processing by the cloud platform 106. In some implementations, the input data may include screenshots or video clips uploaded by the user to illustrate error messages or problematic system behaviors. In some implementations, the input data may be transmitted securely to the cloud platform 106 through encrypted communication channels to protect sensitive information.

At 804, the cloud platform may parse the input data to determine task parameters and construct a workflow representation of tasks, which may include operating-system-level input events and associated state transitions. In some implementations, the cloud platform 106 may analyze textual descriptions to identify keywords or phrases that correspond to specific actions or system states. In some implementations, the cloud platform 106 may process screenshots or video clips to detect visual elements, such as buttons, menus, or error messages, that may indicate relevant task parameters. In some implementations, the cloud platform 106 may extract structured data from the input using natural language processing techniques to determine task parameters. In some implementations, the cloud platform 106 may associate the identified task parameters with predefined templates to construct the workflow representation.

At 806, the I/O controller may execute the workflow representation by generating operating-system-level input events and verifying state transitions through a perception layer to determine task completion. In some implementations, the I/O controller 606 may simulate cursor movements to interact with graphical user interface elements, such as clicking buttons or selecting menu options. In some implementations, the I/O controller 606 may generate keystrokes to input text into form fields or execute keyboard shortcuts for system commands. In some implementations, the I/O controller 606 may simulate mouse clicks to confirm user prompts or interact with dialog boxes. In some implementations, the perception layer component 510 may capture pre-action and post-action screenshots to verify whether the intended state transitions have occurred.

At 808, the workflow automation component may log each executed input event and corresponding state transition in a provenance module with cryptographic metadata for auditability. In some implementations, the workflow automation component 604 may record the timestamp of each input event along with cryptographic metadata to establish a chronological sequence of actions. In some implementations, the workflow automation component 604 may store pre-action and post-action screenshots in the provenance module to support verification of state transitions. In some implementations, the workflow automation component 604 may include unique identifiers for each logged event to distinguish it from other events within the same workflow. In some implementations, the cryptographic metadata may be encrypted using a secure key management system to restrict access to authorized users.

FIG. 9 illustrates a labeled flowchart 900 that supports techniques for automating code analysis, dependency mapping, and adaptive task execution with AI in accordance with various aspects of the present disclosure. Operations illustrated in the labeled flowchart 900 may involve a user device, a cloud platform, and/or other participants, which may be examples of corresponding devices described herein. The labeled flowchart 900 may describe a process for transmitting input data, constructing workflows, executing tasks, and providing feedback with cryptographic metadata for auditability.

At 902, the user device may transmit input data to the cloud platform representing one or more computer issues. In some implementations, the input data may include textual descriptions of the computer issues entered by a user through a graphical user interface on the user device 104. In some implementations, the input data may include screenshots or video recordings captured by the user device 104 to visually represent the computer issues. In some implementations, the input data may include system logs or error codes automatically generated by the user device 104 to describe the issues. In some implementations, the input data may include audio recordings of the user describing the computer issues, which may be converted to text by the cloud platform 106.

At 904, the cloud platform may receive task parameters and a workflow representation of tasks constructed based on the input data, which may include operating-system-level input events and associated state transitions. In some implementations, the cloud platform 106 may determine task parameters by analyzing keywords and contextual phrases in the input data to identify specific actions or system states. In some implementations, the cloud platform 106 may determine task parameters by processing visual elements in screenshots or videos, such as identifying error messages or interface components. In some implementations, the workflow representation may include a sequence of operating-system-level input events, such as cursor movements, keystrokes, or mouse clicks, mapped to corresponding state transitions. In some implementations, the workflow representation may include conditional logic to handle alternative state transitions based on the presence of specific error messages or unexpected system responses.

At 906, the user device may execute operating-system-level input events specified in the workflow representation and monitor state transitions through a perception layer to determine task completion. In some implementations, the user device 104 may generate input events such as cursor movements to interact with graphical user interface elements, including clicking buttons or navigating menus. In some implementations, the user device 104 may generate input events such as keystrokes to enter data into form fields or execute keyboard shortcuts for specific commands. In some implementations, the perception layer may determine state transitions by analyzing pre-execution and post-execution screenshots to detect changes in graphical user interface elements. In some implementations, the perception layer may determine state transitions by comparing accessibility tree snapshots to identify modifications in roles, states, or attributes of interface components.

At 908, the user device may provide execution feedback to the cloud platform for each input event and corresponding state transition, which may include cryptographic metadata for auditability. In some implementations, the execution feedback may include timestamps for each input event to establish a chronological sequence of actions. In some implementations, the execution feedback may include unique identifiers for each state transition to distinguish it from other transitions within the same workflow. In some implementations, the cryptographic metadata may include hashes of pre-execution and post-execution screenshots to verify the integrity of the recorded data. In some implementations, the execution feedback may include contextual information such as the active application or window during the execution of each input event.

Figure 10:
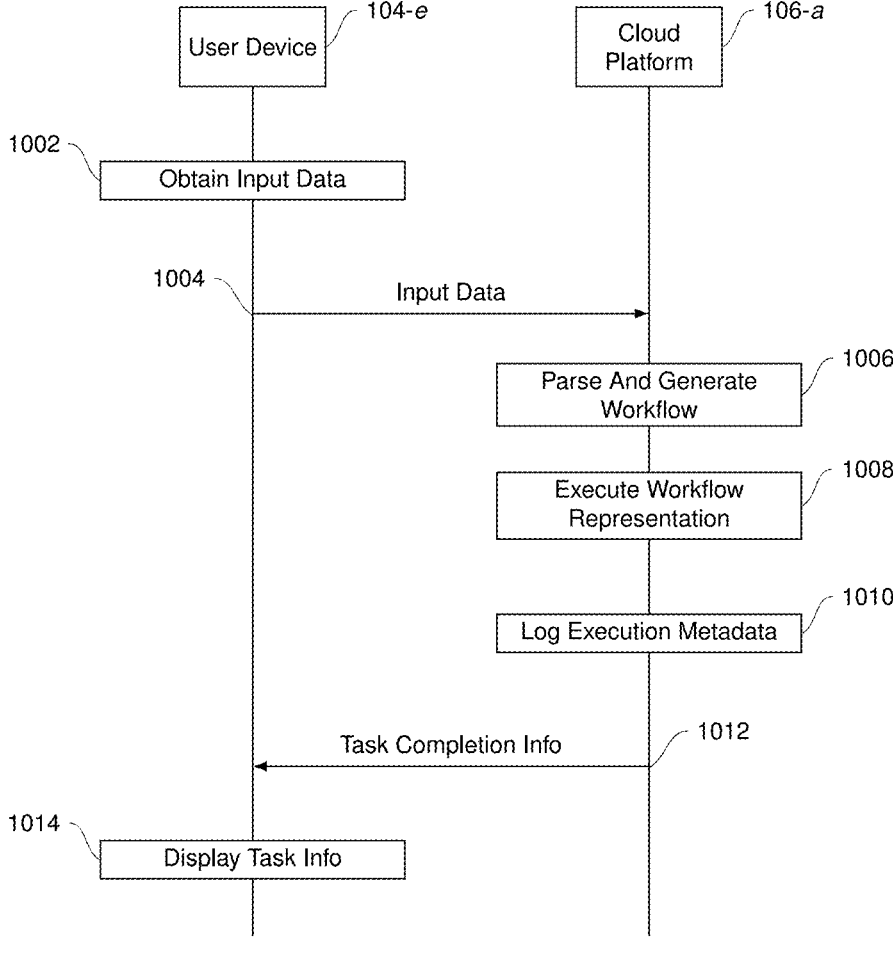
FIG. 10 illustrates an example of a process flow that supports automating code analysis, dependency mapping, and adaptive task execution with AI in accordance with various aspects of the present disclosure.

FIG. 10 illustrates an example of a process flow 1000 that supports automating code analysis, dependency mapping, and adaptive task execution with AI in accordance with aspects of the present disclosure. In some examples, the process flow 1000 may implement aspects of the system 100. For example, the process flow 1000 may include a user device 104-e and a cloud platform 106-a, which may be examples of corresponding devices described herein. In some implementations, a user device 104-e transmits input data, including a codebase and associated documentation, to a cloud platform 106-a, which parses the data to extract task parameters, generate meta tags, construct a workflow representation of tasks, execute the workflow with operating-system-level input events and state transitions verified through a perception layer, and log the events and transitions in a provenance module with cryptographic metadata for secure auditability.

At 1002, the user device 104-e may obtain input data from a user, the input data including a codebase and associated documentation. For example, the user device 104-e may receive a Python codebase along with Markdown files containing API descriptions and usage guidelines. In some implementations, the user device 104-e may accept input data in the form of a JavaScript project repository paired with a set of FAQs and troubleshooting guides. The user device 104-e may also process input data that includes screenshots of error messages or logs that may provide context for the codebase.

At 1004, the user device 104-e may transmit the input data to the cloud platform 106-a. For example, the user device 104-e may send textual descriptions of computer issues, including error messages or troubleshooting queries, to the cloud platform 106-a for processing. In some implementations, the user device 104-*e* may transmit audio recordings of user-reported issues, which may be converted into text by the cloud platform 106-*a* for further analysis. The user device 104-*e* may transmit visual data, such as screenshots or video clips, depicting system states or error prompts to the cloud platform 106-*a* to assist in task parameter extraction.

At 1006, the cloud platform 106-*a* may parse the input data to extract task parameters, may generate meta tags describing functions and dependencies, and may construct a workflow representation of tasks, the workflow representation may include operating-system-level input events and associated state transitions. For example, the cloud platform 106-*a* may determine task parameters by analyzing keywords in textual descriptions or identifying patterns in error logs. In some implementations, the cloud platform 106-*a* may generate meta tags that describe the purpose, parameters, and return values of functions within the input data. In some implementations, the cloud platform 106-*a* may construct the workflow representation by mapping identified dependencies between tasks and associating them with specific operating-system-level input events.

At 1008, the cloud platform 106-*a* may execute the workflow representation by generating the operating-system-level input events and verifying state transitions through a perception layer that may capture pre-execution and post-execution states. For example, the cloud platform 106-*a* may simulate cursor movements to interact with graphical user interface elements, such as clicking buttons or selecting menu options. In some implementations, the cloud platform 106-*a* may generate keystrokes to input text into form fields or execute keyboard shortcuts for specific commands. In some implementations, the cloud platform 106-*a* may analyze screenshots captured before and after executing input events to detect changes in graphical user interface elements, such as the appearance of confirmation dialogs or error messages.

At 1010, the cloud platform 106-*a* may log each executed input event and corresponding state transition in a provenance module with cryptographic metadata for secure auditability. For example, the cloud platform 106-*a* may record timestamps for each input event and associate them with unique identifiers to distinguish between different workflows. In some implementations, the cloud platform 106-*a* may store pre-execution and post-execution screenshots alongside cryptographic hashes to verify the integrity of logged state transitions. In some implementations, the cloud platform 106-*a* may include metadata such as process identifiers or application contexts to provide additional details about the environment in which the input events occurred.

At 1012, the cloud platform 106-*a* may transmit information related to the task completion to the user device 104-*e*. For example, the cloud platform 106-*a* may send a summary of executed tasks, including timestamps and cryptographic metadata, to the user device 104-*e* for display. In some implementations, the cloud platform 106-*a* may transmit visual representations of task workflows, such as flowcharts or diagrams, to the user device 104-*e* to illustrate the sequence of completed actions. In some implementations, the cloud platform 106-*a* may send notifications containing metadata about state transitions, including pre-execution and post-execution screenshots, to the user device 104-*e* for review.

At 1014, the user device 104-*e* may display the information related to the task completion to the user. For example, the user device 104-*e* may present a graphical summary of the completed tasks, including a progress bar or checklist that may indicate the status of individual actions. In some implementations, the user device 104-*e* may render a flowchart or diagram illustrating the sequence of steps executed during the task completion. In some implementations, the user device 104-*e* may display notifications containing metadata, such as timestamps and cryptographic hashes, to allow the user to review the details of the completed tasks.

Figure 11:
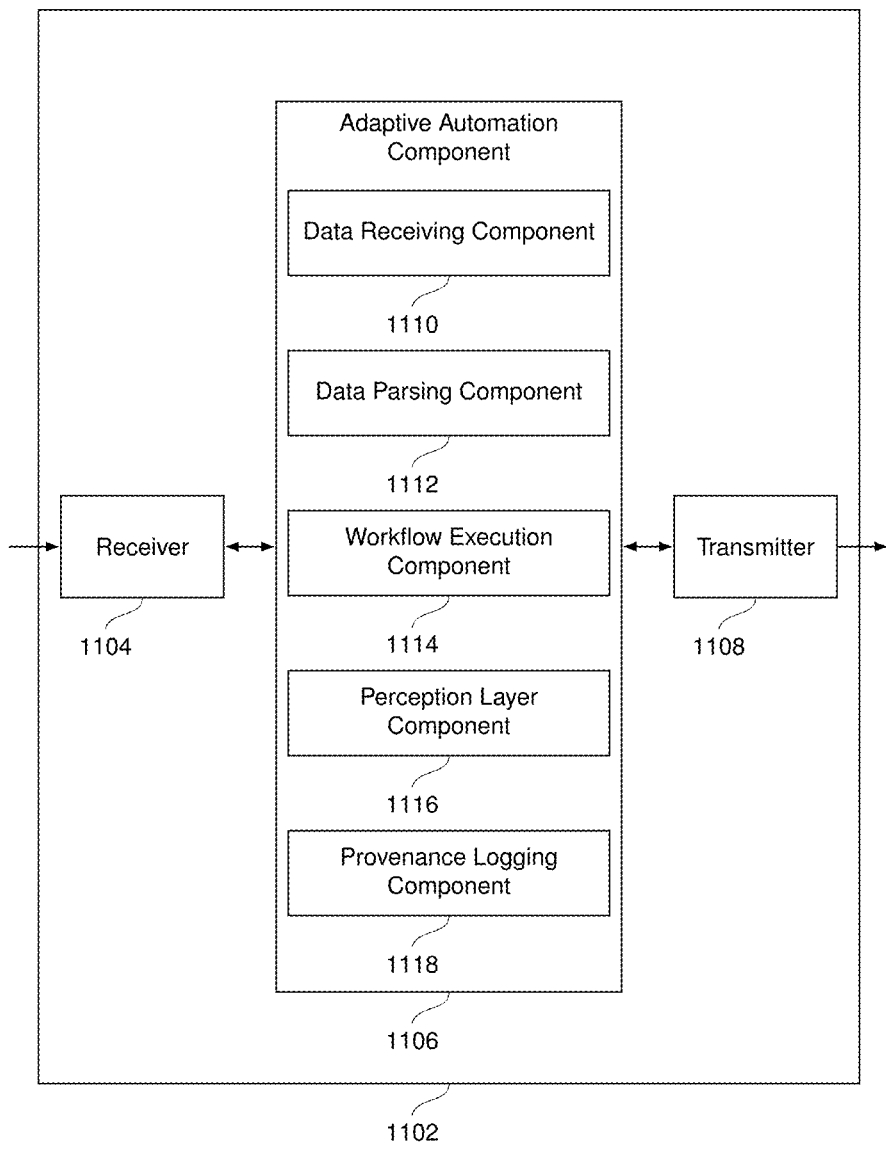
FIG. 11 illustrates an example of a block diagram of an apparatus that supports automating code analysis, dependency mapping, and adaptive task execution with AI in accordance with various aspects of the present disclosure.

FIG. 11 shows a block diagram 1100 of an apparatus 1102 that supports automating code analysis, dependency mapping, and adaptive task execution with AI in accordance with various aspects of the present disclosure. The apparatus 1102 may include an input module 1104, adaptive automation component 1106, and an output module 1108. The apparatus 1102 may also include a processor. Each of these components may be in communication with one another (e.g., via one or more buses). In some cases, the apparatus 1102 may be an example of a user terminal, a database server, or a system containing multiple computing devices.

The input module 1104 may manage input signals for the apparatus 1102. For example, the input module 1104 may identify input signals based on an interaction with a modem, a keyboard, a mouse, a touchscreen, or a similar device. These input signals may be associated with user input or processing at other components or devices. In some cases, the input module 1104 may utilize an operating system such as iOS®, ANDROID®, MS-DOS®, MS-WINDOWS®, OS/2®, UNIX®, LINUX®, or another known operating system to handle input signals. The input module 1104 may send aspects of these input signals to other components of the apparatus 1102 for processing. In some cases, the input module 1104 may be a component of an input/output (I/O) controller 1306 as described with reference to FIG. 13.

The adaptive automation component 1106 may include one or more of a data receiving component 1110, a data parsing component 1112, a workflow execution component 1114, a perception layer component 1116, a provenance logging component 1118, and/or other components. The adaptive automation component 1106 may be an example of aspects of the adaptive automation component 1202 or 1304 described with reference to FIGS. 12 and 13.

The data receiving component 1110 may be configured as or otherwise support a means for receiving input data at a server platform, the input data including a codebase and associated documentation. The data parsing component 1112 may be configured as or otherwise support a means for parsing the input data to extract task parameters, generate meta tags describing functions and dependencies, and construct a workflow representation of tasks, the workflow representation including operating-system-level input events and associated state transitions. The workflow execution component 1114 may be configured as or otherwise support a means for executing the workflow representation by generating the operating-system-level input events. The perception layer component 1116 may be configured as or otherwise support a means for verifying state transitions by capturing pre-execution and post-execution states. The provenance logging component 1118 may be configured as or otherwise support a means for logging each executed input event and corresponding state transition in a provenance module with cryptographic metadata for secure auditability.

The output module 1108 may manage output signals for the apparatus 1102. For example, the output module 1108 may receive signals from other components of the apparatus 1102, such as the adaptive automation component 1106, and may transmit these signals to other components or devices. In some specific examples, the output module 1108 may transmit output signals for display in a user interface, for storage in a database or data store, for further processing at a server or server cluster, or for any other processes at any number of devices or systems. In some cases, the output module 1108 may be a component of an I/O controller 1306 as described with reference to FIG. 13.

Figure 12:
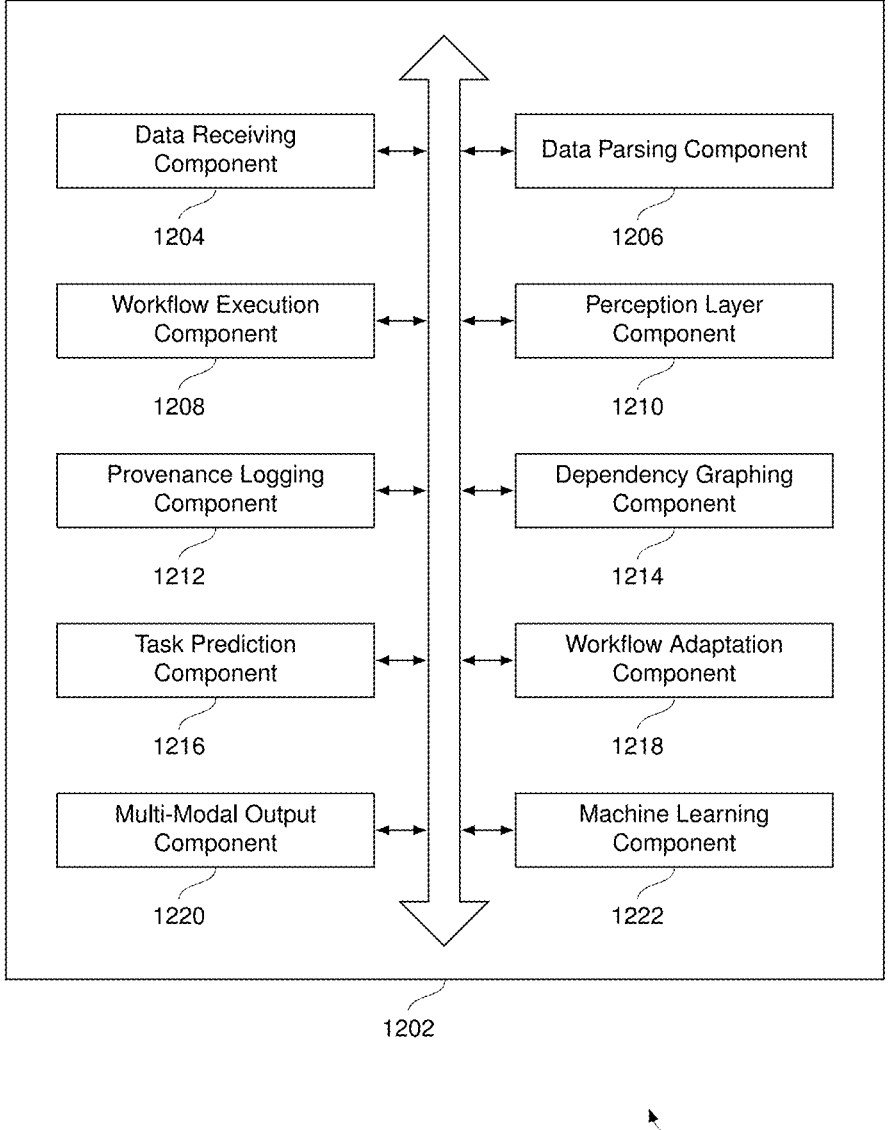
FIG. 12 illustrates an example of a block diagram of an adaptive automation component that supports automating code analysis, dependency mapping, and adaptive task execution with AI in accordance with various aspects of the present disclosure.

FIG. 12 shows a block diagram 1200 of an adaptive automation component 1202 that supports automating code analysis, dependency mapping, and adaptive task execution with AI in accordance with various aspects of the present disclosure. The adaptive automation component 1202 may be an example of aspects of an adaptive automation component 1106, an adaptive automation component 1304, or both, as described herein. The adaptive automation component 1202, or various components thereof, may be an example of means for performing various aspects of automating code analysis, dependency mapping, and adaptive task execution with AI as described herein. For example, the adaptive automation component 1202 may include one or more of a data receiving component 1204, a data parsing component 1206, a workflow execution component 1208, a perception layer component 1210, a provenance logging component 1212, a dependency graphing component 1214, a task prediction component 1216, a workflow adaptation component 1218, a multi-modal output component 1220, a machine learning component 1222, and/or other components. Each of these components may communicate, directly or indirectly, with one another (e.g., via one or more buses).

The data receiving component 1204 may be configured as or otherwise support a means for receiving input data at a server platform, the input data may include a codebase and associated documentation. In some implementations, the input data may include metadata extracted from the codebase, such as function names, parameters, and interdependencies. In some implementations, the input data may include user-generated documentation, such as FAQs or help files, formatted in text or multimedia formats.

The data receiving component 1204 may be configured as or otherwise support a means for receiving input data at a server platform, the input data may include a codebase and associated documentation. In some implementations, the input data may include version control information, such as commit histories or branch structures, to track changes in the codebase. In some implementations, the input data may include external library references or API specifications that interact with the codebase.

The data parsing component 1206 may be configured as or otherwise support a means for parsing the input data to extract task parameters, may generate meta tags describing functions and dependencies, and may construct a workflow representation of tasks, the workflow representation may include operating-system-level input events and associated state transitions. In some implementations, the data parsing component 1206 may determine task parameters by analyzing textual descriptions of computer issues to identify keywords and contextual phrases. In some implementations, the data parsing component 1206 may determine task parameters by processing screenshots to detect visual elements such as buttons, menus, or error messages.

The data parsing component 1206 may generate meta tags describing functions and dependencies. In some implementations, the data parsing component 1206 may generate meta tags that include descriptions of function purposes, input parameters, and return values extracted from the codebase. In some implementations, the data parsing component 1206 may generate meta tags that describe interdependencies between modules, external libraries, and API calls.

The data parsing component 1206 may construct a workflow representation of tasks, the workflow representation may include operating-system-level input events and associated state transitions. In some implementations, the data parsing component 1206 may construct the workflow representation by mapping extracted task parameters to predefined templates that represent common system workflows. In some implementations, the data parsing component 1206 may construct the workflow representation by associating state transitions with specific input events, such as cursor movements, keystrokes, or mouse clicks.

The workflow execution component 1208 may be configured as or otherwise support a means for executing the workflow representation by generating the operating-system-level input events and verifying state transitions through a perception layer that may capture pre-execution and post-execution states. In some implementations, the workflow execution component 1208 may generate operating-system-level input events such as cursor movements to interact with graphical user interface elements, including clicking buttons or selecting menu options. In some implementations, the workflow execution component 1208 may generate keystrokes to input text into form fields or execute keyboard shortcuts for system commands.

The workflow execution component 1208 may verify state transitions through a perception layer that may capture pre-execution and post-execution states. In some implementations, the perception layer of the workflow execution component 1208 may analyze screenshots to detect changes in graphical user interface elements, such as the appearance of confirmation dialogs or error messages. In some implementations, the perception layer of the workflow execution component 1208 may compare accessibility tree snapshots to determine modifications in element roles, states, or attributes.

The perception layer component 1210 may be configured as or otherwise support a means for capturing pre-execution and post-execution states to verify state transitions during execution of the workflow representation. In some implementations, the perception layer component 1210 may capture pre-execution states by taking screenshots of the graphical user interface to record the initial layout and visible elements. In some implementations, the perception layer component 1210 may capture pre-execution states by analyzing the accessibility tree to identify the roles and attributes of interface components before any input events occur. The perception layer component 1210 may capture post-execution states by recording screenshots after the workflow representation has been executed to observe any changes in the graphical user interface. In some implementations, the perception layer component 1210 may capture post-execution states by extracting text from the interface using optical character recognition to detect the presence of error messages or confirmation prompts. The perception layer component 1210 may determine state transitions by comparing pre-execution and post-execution screenshots to identify differences in the arrangement or appearance of interface elements. In some implementations, the perception layer component 1210 may determine state transitions by analyzing changes in the accessibility tree to detect modifications in the states or attributes of specific components.

The provenance logging component 1212 may be configured as or otherwise support a means for logging each executed input event and corresponding state transition in a provenance module with cryptographic metadata for secure auditability. In some implementations, the provenance logging component 1212 may determine unique identifiers for input events to distinguish them from other events within the same workflow. In some implementations, the provenance logging component 1212 may record timestamps for each input event to establish a chronological sequence of actions.

In some implementations, the provenance logging component 1212 may store cryptographic hashes of pre-execution and post-execution states to verify the integrity of logged data. In some implementations, the provenance logging component 1212 may determine metadata related to the application context, such as active window identifiers or process names, to provide additional context for logged events. In some implementations, the provenance logging component 1212 may encrypt the logged metadata with keys generated by a secure key management system to restrict unauthorized access.

In some examples, the dependency graphing component 1214 may be configured as or otherwise support a means for generating a dependency graph that may visually represent relationships among functions, classes, modules, and external libraries, and rendering the dependency graph through an interactive interface that may support filtering by relationship type and zooming into specific nodes. In some implementations, the dependency graphing component 1214 may determine relationships by analyzing import statements and function calls within the codebase to identify dependencies. In some implementations, the dependency graphing component 1214 may include a feature that may allow users to highlight specific nodes based on criteria such as module size or frequency of use. In some implementations, the dependency graphing component 1214 may support exporting the dependency graph in formats such as JSON or XML for integration with external tools.

In some examples, the task prediction component 1216 may be configured as or otherwise support a means for analyzing historical user interactions with the workflow representation to predict subsequent tasks and may append the predicted tasks to the workflow representation for execution. In some implementations, the task prediction component 1216 may determine patterns in user interactions by examining timestamps and frequency of specific task executions within the workflow representation. In some implementations, the task prediction component 1216 may identify recurring sequences of tasks by analyzing metadata associated with prior workflows, such as task dependencies or user preferences.

In some implementations, the task prediction component 1216 may predict subsequent tasks by referencing external data sources, such as logs of system events or user-generated documentation, to infer likely next steps. In some implementations, the task prediction component 1216 may append predicted tasks to the workflow representation by inserting them as new nodes in a finite-state machine that represents the workflow structure. In some implementations, the task prediction component 1216 may append predicted tasks by associating them with specific state transitions, such as cursor movements or keystrokes, to integrate them seamlessly into the existing workflow.

In some examples, the workflow adaptation component 1218 may be configured as or otherwise support a means for adapting the workflow representation to include alternative operating-system-level input events in response to detecting a failure in a state transition during execution. In some implementations, the workflow adaptation component 1218 may determine alternative input events by referencing a database of historical workflows that include previously successful state transitions under similar conditions. In some implementations, the workflow adaptation component 1218 may adapt the workflow representation by substituting a failed cursor movement with a sequence of keystrokes designed to achieve the same interaction. In some implementations, the workflow adaptation component 1218 may adapt the workflow representation by introducing a delay between input events to account for system latency that may have caused the failure.

In some examples, the multi-modal output component 1220 may be configured as or otherwise support a means for generating multi-modal outputs, including text, voice, graphics, and media, to provide user-facing explanations of the workflow representation and its execution results. In some implementations, the multi-modal output component 1220 may generate text-based outputs that include detailed descriptions of workflow steps and state transitions, formatted as structured paragraphs or bullet points. In some implementations, the multi-modal output component 1220 may generate voice outputs by synthesizing audio explanations of workflow execution results, which may be delivered through speakers or headphones connected to the user device.

In some implementations, the multi-modal output component 1220 may generate graphics outputs that include visual representations of workflow structures, such as flowcharts or diagrams, rendered in formats like PNG or SVG. In some implementations, the multi-modal output component 1220 may generate media outputs that include video recordings of workflow execution, which may capture cursor movements, keystrokes, and changes in graphical user interface elements. In some implementations, the multi-modal output component 1220 may support customization of output formats, allowing users to select preferred modalities or combine multiple modalities into a single output package.

In some examples, the machine learning component 1222 may be configured as or otherwise support a means for training a machine learning model on the meta tags and task parameters to refine the parsing of subsequent input data and may enhance the accuracy of the workflow representation. In some implementations, the machine learning component 1222 may determine patterns in the meta tags by analyzing relationships between function parameters and return values across multiple workflows. In some implementations, the machine learning component 1222 may train the model on task parameters extracted from user-generated documentation, such as FAQs or help files, to account for variations in input data formats. In some implementations, the machine learning component 1222 may incorporate external data sources, such as API specifications or library documentation, to expand the model's understanding of potential dependencies.

Figure 13:
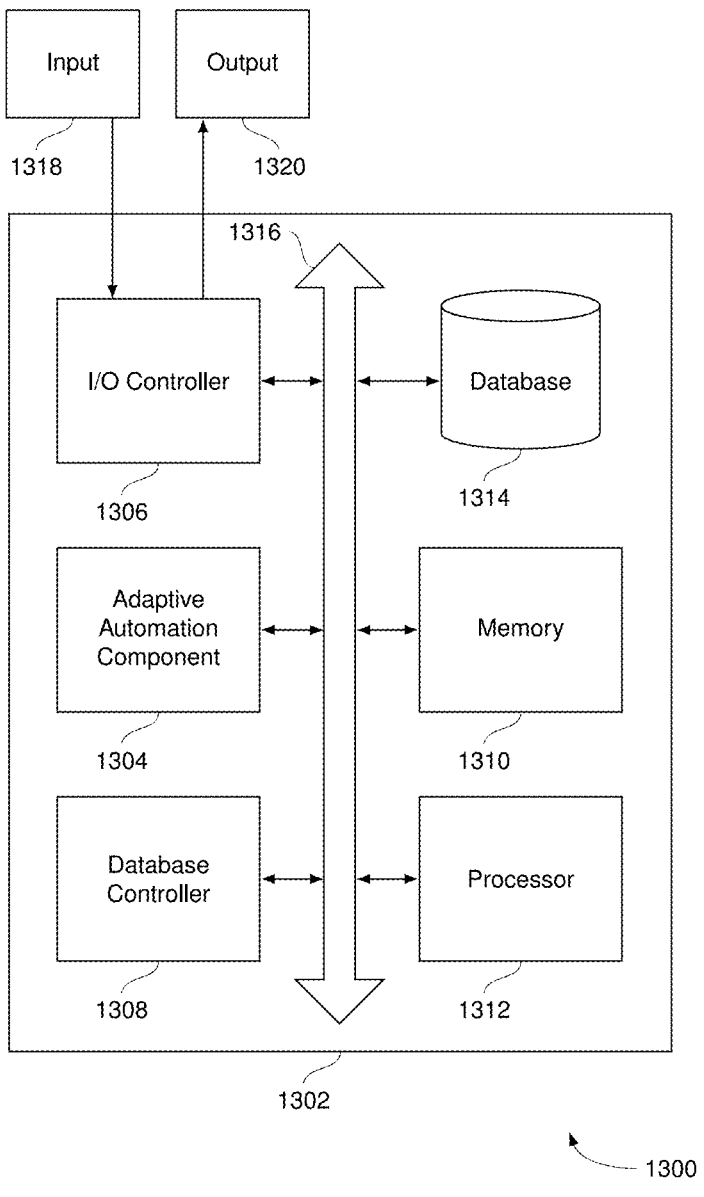
FIG. 13 illustrates an example of a diagram of a system including a device that supports automating code analysis, dependency mapping, and adaptive task execution with AI in accordance with various aspects of the present disclosure.

FIG. 13 shows a diagram of a system 1300 including a device 1302 that supports automating code analysis, dependency mapping, and adaptive task execution with AI in accordance with aspects of the present disclosure. The device 1302 may be an example of or include the components of a database server or an apparatus 1102 as described herein. The device 1302 may include components for bi-directional data communications including components for transmitting and receiving communications, including an adaptive automation component 1304, an I/O controller 1306, a database controller 1308, memory 1310, a processor 1312, and a database 1314. These components may be in electronic communication via one or more buses (e.g., bus 1316).

The adaptive automation component 1304 may be an example of an adaptive automation component 1106 or 1202 as described herein. For example, the adaptive automation component 1304 may perform any of the methods or processes described above with reference to FIGS. 11 and 12. In some cases, the adaptive automation component 1304 may be implemented in hardware, software executed by a processor, firmware, or any combination thereof.

The I/O controller 1306 may manage input signals 1318 and output signals 1320 for the device 1302. The I/O controller 1306 may also manage peripherals not integrated into the device 1302. In some cases, the I/O controller 1306 may represent a physical connection or port to an external peripheral. In some cases, the I/O controller 1306 may utilize an operating system such as iOS®, ANDROID®, MS-DOS®, MS-WINDOWS®, OS/2®, UNIX®, LINUX®, or another known operating system. In other cases, the I/O controller 1306 may represent or interact with a modem, a keyboard, a mouse, a touchscreen, or a similar device. In some cases, the I/O controller 1306 may be implemented as part of a processor. In some cases, a user may interact with the device 1302 via the I/O controller 1306 or via hardware components controlled by the I/O controller 1306.

The database controller 1308 may manage data storage and processing in a database 1314. In some cases, a user may interact with the database controller 1308. In other cases, the database controller 1308 may operate automatically without user interaction. The database 1314 may be an example of a single database, a distributed database, multiple distributed databases, a data store, a data lake, or an emergency backup database.

Memory 1310 may include random-access memory (RAM) and read-only memory (ROM). The memory 1310 may store computer-readable, computer-executable software including instructions that, when executed, cause the processor to perform various functions described herein. In some cases, the memory 1310 may contain, among other things, a basic input/output system (BIOS) which may control basic hardware or software operation such as the interaction with peripheral components or devices.

The processor 1312 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1312 may be configured to operate a memory array using a memory controller. In other cases, a memory controller may be integrated into the processor 1312. The processor 1312 may be configured to execute computer-readable instructions stored in a memory 1310 to perform various functions (e.g., functions or tasks supporting automating code analysis, dependency mapping, and adaptive task execution with AI).

FIG. 14 shows a flowchart illustrating a method 1400 that supports automating code analysis, dependency mapping, and adaptive task execution with AI in accordance with various aspects of the present disclosure. The operations of the method 1400 may be implemented by one or more components of a networked computing system as described herein. For example, the operations of the method 1400 may be performed by an adaptive automation component as described with reference to FIGS. 11 through 13. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 1402, the method 1400 may include receiving input data at a server platform, the input data including a codebase and associated documentation. The operations of 1402 may be performed in accordance with examples as disclosed herein. In some examples, aspects of the operations of 1402 may be performed by a data receiving component 1204 as described with reference to FIG. 12.

At 1404, the method 1400 may include parsing the input data to extract task parameters, generate meta tags describing functions and dependencies, and construct a workflow representation of tasks, the workflow representation including operating-system-level input events and associated state transitions. The operations of 1404 may be performed in accordance with examples as disclosed herein. In some examples, aspects of the operations of 1404 may be performed by a data parsing component 1206 as described with reference to FIG. 12.

At 1406, the method 1400 may include executing the workflow representation by generating the operating-system-level input events and verifying state transitions through a perception layer that captures pre-execution and post-execution states. The operations of 1406 may be performed in accordance with examples as disclosed herein. In some examples, aspects of the operations of 1406 may be performed by a workflow execution component 1208 as described with reference to FIG. 12.

At 1408, the method 1400 may include logging each executed input event and corresponding state transition in a provenance module with cryptographic metadata for secure auditability. The operations of 1408 may be performed in accordance with examples as disclosed herein. In some examples, aspects of the operations of 1408 may be performed by a provenance logging component 1212 as described with reference to FIG. 12.

FIG. 15 shows a flowchart illustrating a method 1500 that supports automating code analysis, dependency mapping, and adaptive task execution with AI in accordance with various aspects of the present disclosure. The operations of the method 1500 may be implemented by one or more components of a networked computing system as described herein. For example, the operations of the method 1500 may be performed by an adaptive automation component as described with reference to FIGS. 11 through 13. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 1502, the method 1500 may include transmitting input data from a user device to a server platform, the input data including a codebase and associated documentation. The operations of 1502 may be performed in accordance with examples as disclosed herein. In some examples, aspects of the operations of 1502 may be performed by a data receiving component 1204 as described with reference to FIG. 12.

At 1504, the method 1500 may include receiving, at the user device, task parameters, meta tags describing functions and dependencies, and a workflow representation of tasks constructed by the server platform, the workflow representation including operating-system-level input events and associated state transitions. The operations of 1504 may be performed in accordance with examples as disclosed herein.

In some examples, aspects of the operations of 1504 may be performed by a data parsing component 1206 as described with reference to FIG. 12.

At 1506, the method 1500 may include executing, at the user device, the operating-system-level input events speci- fied in the workflow representation and monitoring state transitions through a perception layer that captures pre-execution and post-execution states. The operations of 1506 may be performed in accordance with examples as disclosed herein. In some examples, aspects of the operations of 1506 may be performed by a workflow execution component 1208 and a perception layer component 1210 as described with reference to FIG. 12.

At 1508, the method 1500 may include providing, from the user device to the server platform, execution feedback for each input event and corresponding state transition, including cryptographic metadata for secure auditability. The operations of 1508 may be performed in accordance with examples as disclosed herein. In some examples, aspects of the operations of 1508 may be performed by a provenance logging component 1212 as described with reference to FIG. 12.

It should be noted that the methods described herein describe possible implementations, and that the operations and the steps may be rearranged or otherwise modified and that other implementations are possible. Furthermore, aspects from two or more of the methods may be combined.

Aspect 1: A method for automating code analysis, depen- dency mapping, and adaptive task execution with AI, comprising: receiving input data at a server platform, the input data including a codebase and associated documentation; parsing the input data to extract task parameters, generate meta tags describing functions and dependencies, and construct a workflow represen- tation of tasks, the workflow representation including operating-system-level input events and associated state transitions; executing the workflow representation by generating the operating-system-level input events and verifying state transitions through a perception layer that captures pre-execution and post-execution states; and logging each executed input event and corresponding state transition in a provenance module with cryptographic metadata for secure auditability.

Aspect 2: The method of aspect 1, further comprising generating a dependency graph that visually represents relationships among functions, classes, modules, and external libraries, and rendering the dependency graph through an interactive interface that supports filtering by relationship type and zooming into specific nodes.

Aspect 3: The method of any of aspects 1 through 2, further comprising analyzing historical user interac- tions with the workflow representation to predict sub- sequent tasks and appending the predicted tasks to the workflow representation for execution.

Aspect 4: The method of any of aspects 1 through 3, further comprising adapting the workflow representa- tion to include alternative operating-system-level input events in response to detecting a failure in a state transition during execution.

Aspect 5: The method of any of aspects 1 through 4, further comprising generating multi-modal outputs, including text, voice, graphics, and media, to provide user-facing explanations of the workflow representa- tion and its execution results.

Aspect 6: The method of any of aspects 1 through 5, further comprising training a machine learning model on the meta tags and task parameters to refine the parsing of subsequent input data and enhance the accuracy of the workflow representation.

Aspect 7: The method of any of aspects 1 through 6, wherein the perception layer captures accessibility tree snapshots and compares hierarchical structures to verify state transitions associated with the operating-system-level input events.

Aspect 8: The method of any of aspects 1 through 7, wherein the provenance module stores cryptographic metadata including timestamps, unique identifiers, and hashes of pre-execution and post-execution states for auditability.

Aspect 9: The method of any of aspects 1 through 8, wherein the workflow representation includes condi- tional logic for selecting alternative state transitions in response to detecting specific error messages during execution.

Aspect 10: The method of any of aspects 1 through 9, wherein the workflow representation incorporates pre- dictive task suggestions derived from analyzing pat- terns in historical user interactions and system logs.

Aspect 11: A system for automating code analysis, depen- dency mapping, and adaptive task execution with AI, comprising a processor; memory coupled with the processor; and instructions stored in the memory and executable by the processor to cause the system to perform a method of any of aspects 1 through 10.

Aspect 12: A system for automating code analysis, depen- dency mapping, and adaptive task execution with AI, comprising at least one means for performing a method of any of aspects 1 through 10.

Aspect 13: A non-transitory computer-readable medium storing code for automating code analysis, dependency mapping, and adaptive task execution with AI, the code comprising instructions executable by a processor to perform a method of any of aspects 1 through 10.

Aspect 14: A method for generating autonomous help desk actions through machine learning and workflow automation, comprising: receiving input data at a server platform, the input data representing one or more computer issues; parsing the input data to extract task parameters and constructing a workflow representation of tasks based on the task parameters, the workflow representation including operating-system-level input events and associated state transitions; executing the workflow representation by generating the operating-system-level input events and verifying state transitions through a perception layer to ensure task completion; and logging each executed input event and correspond- ing state transition in a provenance module with cryp- tographic metadata for auditability.

Aspect 15: The method of Aspect 14, further comprising generating a fallback workflow representation in response to detecting a failure in the state transitions, the fallback workflow representation including alterna- tive operating-system-level input events and corre- sponding state transitions to achieve task completion.

Aspect 16: The method of any of Aspects 14 and 15, further comprising transmitting a notification to a remote client device in response to logging an executed input event, the notification including metadata from the provenance module and a summary of the corre- sponding state transition.

Aspect 17: The method of any of Aspects 14 to 16, further comprising constructing a visual representation of the workflow representation, the visual representation including graphical depictions of operating-system-level input events and state transitions for display on a user interface.

Aspect 18: The method of any of Aspects 14 to 17, further comprising analyzing historical provenance module data to identify recurring state transition failures and updating the workflow representation to include pre-emptive modifications addressing the identified failures.

Aspect 19: The method of any of Aspects 14 to 18, further comprising encrypting the cryptographic metadata in the provenance module with a key generated by a secure key management system, the encrypted metadata being accessible for audit purposes through an authentication protocol.

Aspect 20: The method of any of Aspects 14 to 19, wherein the perception layer captures pre-execution and post-execution screenshots of graphical user interface states and stores the screenshots in the provenance module for subsequent verification.

Aspect 21: The method of any of Aspects 14 to 20, wherein the operating-system-level input events include cursor movements, keystrokes, mouse clicks, and touch gestures, each event being associated with a corresponding state transition.

Aspect 22: The method of any of Aspects 14 to 21, wherein the provenance module generates a timestamp for each logged input event and associates the timestamp with the corresponding state transition metadata.

Aspect 23: The method of any of Aspects 14 to 22, wherein constructing the workflow representation of tasks is at least partially accomplished using a machine learning module.

Aspect 24: The method of any of Aspects 14 to 23, wherein the cryptographic metadata includes a hash of the pre-execution and post-execution state transitions, the hash being stored in the provenance module for audit purposes.

Aspect 25: A system configured for generating autonomous help desk actions through machine learning and workflow automation, comprising: a processor; a memory coupled with the processor; and a multiplicity of instructions stored in the memory and executable by the processor to cause the system to: receive input data at a server platform, the input data representing one or more computer issues; parse the input data to extract task parameters and construct a workflow representation of tasks based on the task parameters, the workflow representation including operating-system-level input events and associated state transitions; execute the workflow representation by generating the operating-system-level input events and verifying state transitions through a perception layer to ensure task completion; and log each executed input event and corresponding state transition in a provenance module with cryptographic metadata for auditability.

Aspect 26: The system of Aspect 25, wherein the instructions are further executable by the processor to cause the system to: generate a fallback workflow representation in response to detecting a failure in the state transitions, the fallback workflow representation including alternative operating-system-level input events and corresponding state transitions to achieve task completion.

Aspect 27: The system of any of Aspects 25 and 26, wherein the instructions are further executable by the processor to cause the system to: transmit a notification to a remote client device in response to logging an executed input event, the notification including metadata from the provenance module and a summary of the corresponding state transition.

Aspect 28: The system of any of Aspects 25 to 27, wherein the instructions are further executable by the processor to cause the system to: construct a visual representation of the workflow representation, the visual representation including graphical depictions of operating-system-level input events and state transitions for display on a user interface.

Aspect 29: The system of any of Aspects 25 to 28, wherein the instructions are further executable by the processor to cause the system to: analyze historical provenance module data to identify recurring state transition failures and update the workflow representation to include preemptive modifications addressing the identified failures.

Aspect 30: The system of any of Aspects 25 to 29, wherein the instructions are further executable by the processor to cause the system to: encrypt the cryptographic metadata in the provenance module with a key generated by a secure key management system, the encrypted metadata being accessible for audit purposes through an authentication protocol.

Aspect 31: The system of any of Aspects 25 to 30, wherein the instructions are further executable by the processor to cause the system to: capture pre-execution and post-execution screenshots of graphical user interface states through the perception layer and store the screenshots in the provenance module for subsequent verification.

Aspect 32: The system of any of Aspects 25 to 31, wherein the instructions are further executable by a machine learning module to cause the system to: generate operating-system-level input events including cursor movements, keystrokes, mouse clicks, and touch gestures, each event being associated with a corresponding state transition.

Aspect 33: A non-transitory computer-readable medium storing code for generating autonomous help desk actions through machine learning and workflow automation, the code comprising instructions executable by a processor to: receive input data at a server platform, the input data representing one or more computer issues; parse the input data to extract task parameters and construct a workflow representation of tasks based on the task parameters, the workflow representation including operating-system-level input events and associated state transitions; execute the workflow representation by generating the operating-system-level input events and verifying state transitions through a perception layer to ensure task completion; and log each executed input event and corresponding state transition in a provenance module with cryptographic metadata for auditability.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for automating code analysis, dependency mapping, and adaptive task execution with AI, comprising:
receiving input data at a server platform, the input data including a codebase and associated documentation;
using the AI to parse the input data to extract task parameters, generate meta tags describing functions and dependencies, and construct a workflow representation of tasks, the workflow representation including operating-system-level input events and associated state transitions;
executing the workflow representation by generating the operating-system-level input events and verifying state transitions through a perception layer that captures pre-execution and post-execution states; and
logging each executed input event and corresponding state transition in a provenance module with cryptographic metadata for secure auditability;
wherein, when source code is available, the AI is trained on the codebase and associated documentation, and when source code is unavailable, the AI autonomously explores a graphical user interface by simulating user actions, capturing screenshots, and constructing workflows.

2. The method of claim 1, further comprising generating a dependency graph that visually represents relationships among functions, classes, modules, and external libraries, and rendering the dependency graph through an interactive interface that supports filtering by relationship type and zooming into specific nodes.

3. The method of claim 1, further comprising analyzing historical user interactions with the workflow representation to predict subsequent tasks and appending the predicted tasks to the workflow representation for execution.

4. The method of claim 1, further comprising adapting the workflow representation to include alternative operating-system-level input events in response to detecting a failure in a state transition during execution.

5. The method of claim 1, further comprising generating multi-modal outputs, including text, voice, graphics, and media, to provide user-facing explanations of the workflow representation and its execution results.

6. The method of claim 1, further comprising training a machine learning model on the meta tags and task parameters to refine the parsing of subsequent input data and enhance the accuracy of the workflow representation.

7. The method of claim 1, wherein the perception layer captures accessibility tree snapshots and compares hierarchical structures to verify state transitions associated with the operating-system-level input events.

8. The method of claim 1, wherein the provenance module stores cryptographic metadata including timestamps, unique identifiers, and hashes of pre-execution and post-execution states for auditability.

9. The method of claim 1, wherein the workflow representation includes conditional logic for selecting alternative state transitions in response to detecting specific error messages during execution.

10. The method of claim 1, wherein the workflow representation incorporates predictive task suggestions derived from analyzing patterns in historical user interactions and system logs.

11. The method of claim 1, wherein multiple large language models (LLMs) and generative adversarial networks (GANs) operate in parallel to parse the input data and generate outputs, and a consensus module determines the next action or response based on their collective results.

12. The method of claim 11, wherein the GANs generate visual aids including task flow diagrams, flowcharts, or mockups of user interfaces corresponding to the workflows.

13. A system configured for automating code analysis, dependency mapping, and adaptive task execution with AI, comprising:

a processor;

memory coupled with the processor; and instructions stored in the memory and executable by the processor to cause the system to:

receive input data at a server platform, the input data including a codebase and associated documentation;

using the AI to parse the input data to extract task parameters, generate meta tags describing functions and dependencies, and construct a workflow representation of tasks, the workflow representation including operating-system-level input events and associated state transitions;

execute the workflow representation by generating the operating-system-level input events and verifying state transitions through a perception layer that captures pre-execution and post-execution states; and log each executed input event and corresponding state transition in a provenance module with cryptographic metadata for secure auditability;

wherein, when source code is available, the AI is trained on the codebase and associated documentation, and when source code is unavailable, the AI autonomously explores a graphical user interface by simulating user actions, capturing screenshots, and constructing workflows.

14. The system of claim 13, wherein the instructions are further executable by the processor to cause the system to:

generate a dependency graph that visually represents relationships among functions, classes, modules, and external libraries, and render the dependency graph through an interactive interface that supports filtering by relationship type and zooming into specific nodes.

15. The system of claim 13, wherein the instructions are further executable by the processor to cause the system to:

analyze historical user interactions with the workflow representation to predict subsequent tasks and append the predicted tasks to the workflow representation for execution.

16. The system of claim 13, wherein the instructions are further executable by the processor to cause the system to:

adapt the workflow representation to include alternative operating-system-level input events in response to detecting a failure in a state transition during execution.

17. The system of claim 13, wherein the instructions are further executable by the processor to cause the system to:

generate multi-modal outputs, including text, voice, graphics, and media, to provide user-facing explanations of the workflow representation and its execution results.

18. The system of claim 13, wherein the instructions are further executable by the processor to cause the system to:

train a machine learning model on the meta tags and task parameters to refine the parsing of subsequent input data and enhance the accuracy of the workflow representation.

19. The system of claim 13, wherein the perception layer captures accessibility tree snapshots and compares hierarchical structures to verify state transitions associated with the operating-system-level input events.

20. The system of claim 13, wherein the provenance module stores cryptographic metadata including timestamps, unique identifiers, and hashes of pre-execution and post-execution states for auditability.

21. The system of claim 13, wherein the workflow representation includes conditional logic for selecting alternative state transitions in response to detecting specific error messages during execution.

22. A non-transitory computer-readable medium storing code for automating code analysis, dependency mapping, and adaptive task execution with AI, the code comprising instructions executable by a processor to:

receive input data at a server platform, the input data including a codebase and associated documentation;

using the AI to parse the input data to extract task parameters, generate meta tags describing functions and dependencies, and construct a workflow representation of tasks, the workflow representation including operating-system-level input events and associated state transitions;

execute the workflow representation by generating the operating-system-level input events and verifying state transitions through a perception layer that captures pre-execution and post-execution states; and log each executed input event and corresponding state transition in a provenance module with cryptographic metadata for secure auditability;

wherein, when source code is available, the AI is trained on the codebase and associated documentation, and when source code is unavailable, the AI autonomously explores a graphical user interface by simulating user actions, capturing screenshots, and constructing workflows.

23. A system configured for generating autonomous help desk actions through machine learning and workflow automation, comprising:

a processor;

a memory coupled with the processor; and a multiplicity of instructions stored in the memory and executable by the processor to cause the system to:

receive input data at a server platform, the input data representing one or more computer issues;

using AI to parse the input data to extract task parameters and construct a workflow representation of tasks based on the task parameters, the workflow representation including operating-system-level input events and associated state transitions; execute the workflow representation by generating the operating-system-level input events and verifying state transitions through a perception layer to ensure task completion; and log each executed input event and corresponding state transition in a provenance module with cryptographic metadata for auditability;

wherein, when source code is available, the AI is trained on the codebase and associated documentation, and when source code is unavailable, the AI autonomously explores a graphical user interface by simulating user actions, capturing screenshots, and constructing workflows.

\* \* \* \* \*